United States Patent
Diamant et al.

(10) Patent No.: US 11,423,313 B1
(45) Date of Patent: Aug. 23, 2022

(54) CONFIGURABLE FUNCTION APPROXIMATION BASED ON SWITCHING MAPPING TABLE CONTENT

(71) Applicant: Amazon Technologies, Inc., Seattle, WA (US)

(72) Inventors: Ron Diamant, Albany, CA (US); Sundeep Amirineni, Austin, TX (US); Mohammad El-Shabani, Seattle, WA (US); Kenneth Wayne Patton, Bee Cave, TX (US); Thomas Elmer, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 866 days.

(21) Appl. No.: 16/218,082

(22) Filed: Dec. 12, 2018

(51) Int. Cl.
*G06N 3/08* (2006.01)
*G06N 3/063* (2006.01)
*G06N 3/04* (2006.01)

(52) U.S. Cl.
CPC ........... *G06N 3/084* (2013.01); *G06N 3/0481* (2013.01); *G06N 3/063* (2013.01)

(58) Field of Classification Search
CPC ....... G06N 3/084; G06N 3/0481; G06N 3/063
See application file for complete search history.

(56) References Cited

U.S. PATENT DOCUMENTS

| | | | | |
|---|---|---|---|---|
| 8,407,211 B1* | 3/2013 | Lewis | .................... | G06F 16/29 |
| | | | | 707/722 |
| 2007/0067166 A1* | 3/2007 | Pan | .................... | G10L 19/0216 |
| | | | | 704/222 |
| 2010/0283874 A1* | 11/2010 | Kinrot | .................... | G06T 5/008 |
| | | | | 348/242 |
| 2019/0227771 A1* | 7/2019 | Kitamura | ................ | G06F 7/548 |

OTHER PUBLICATIONS

"NVIDIA CUDA C Programming Guide", CUDA C Programming Guide Version 4.2, Apr. 16. 2012, 173 pages.
"U.S. Appl. No. 16/218,116", filed Dec. 12, 2018, 64 pages.
Abdelsalam et al., "Accurate and Efficient Hyperbolic Tangent Activation Function on FPGA using the DCT Interpolation Filter", Proceedings of the 2017 ACM/SIGDA International Symposium on Field Programmable Gate Arrays, Feb. 22-24, 2017, 8 pages.

(Continued)

*Primary Examiner* — Li Wu Chang
(74) *Attorney, Agent, or Firm* — Kilpatrick Townsend & Stockton LLP

(57) ABSTRACT

Methods and systems for performing hardware approximation of function are provided. In one example, a system comprises a controller, configurable arithmetic circuits, and a mapping table. The mapping table stores a first set of function parameters in a first mode of operation and stores a second set of function parameters in a second mode of operation. Depending on the mode of operation, the controller may configure the arithmetic circuits to compute a first approximation result of a function at an input value based on the first set of function parameters, or to compute a second approximation result of the function at the input value based on the second set of function parameters and to perform post-processing, such as quantization, of the second approximation result.

19 Claims, 16 Drawing Sheets

(56) References Cited

OTHER PUBLICATIONS

Chen et al., "Eyeriss: An Energy-Efficient Reconfigurable Accelerator for Deep Convolutional Neural Networks", IEEE Journal of Solid-State Circuits, vol. 52, No. 1, Nov. 8, 2016, 12 pages.

Emer et al., "Tutorial on Hardware Accelerators for Deep Neural Networks", Available online at: http://eyeriss.mit.edu/tutorial.html, 2016, 4 pages.

Jouppi et al., "In-Datacenter Performance Analysis of a Tensor Processing Unit", 44th International Symposium on Computer Architecture (ISCA), Jun. 24-28, 2017, 17 pages.

Kiningham et al., "Design and Analysis of a Hardware CNN Accelerator", Available online at: http://cs231n.stanford.edu/reports/2017/pdfs/116.pdf, 2017, 8 pages.

Kung, "Why Systolic Architectures?", IEEE Computer Society Press, Computer, vol. 15, No. 1, Jan. 1982, pp. 37-46.

Migacz, "8-bit Inference with TensorRT", Available online at: http://on-demand.gputechconf.com/gtc/2017/presentation/s7310-8-bit-inference-with-tensorrtpdf, May 8, 2017, 41 pages.

Nilsson et al. "Hardware implementation of the Exponential Function Using Taylor Series", 32nd NORCHIP Conference, Oct. 27-28, 2014, 4 pages.

Reda et al., "Power Modeling and Characterization of Computing Devices: A Survey", Foundations and Trends in Electronic Design Automation, vol. 6, No. 2, Feb. 2012, 96 pages.

\* cited by examiner

CONFIGURABLE FUNCTION APPROXIMATION BASED ON SWITCHING MAPPING TABLE CONTENT

BACKGROUND

Artificial neural networks are computing systems with an architecture based on biological neural networks. Artificial neural networks can be trained, using training data, to learn about how to perform a certain computing task.

A neural network may include a set of processing nodes. As part of a neural network computation, each processing node can process a piece of the input data based on a weight to generate an intermediate output. The intermediate outputs can be processed by an activation function to generate activation outputs, which can be further processed to generate a decision or an output. To improve the efficiency and complexity of the neural network computation, the activation outputs can be quantized. The quantization, however, introduces latency to the performance of the computing task and can degrade the overall efficiency of the neural network computation.

BRIEF DESCRIPTION OF THE DRAWINGS

Various embodiments in accordance with the present disclosure will be described with reference to the drawings, in which.

DETAILED DESCRIPTION

Figure 1:
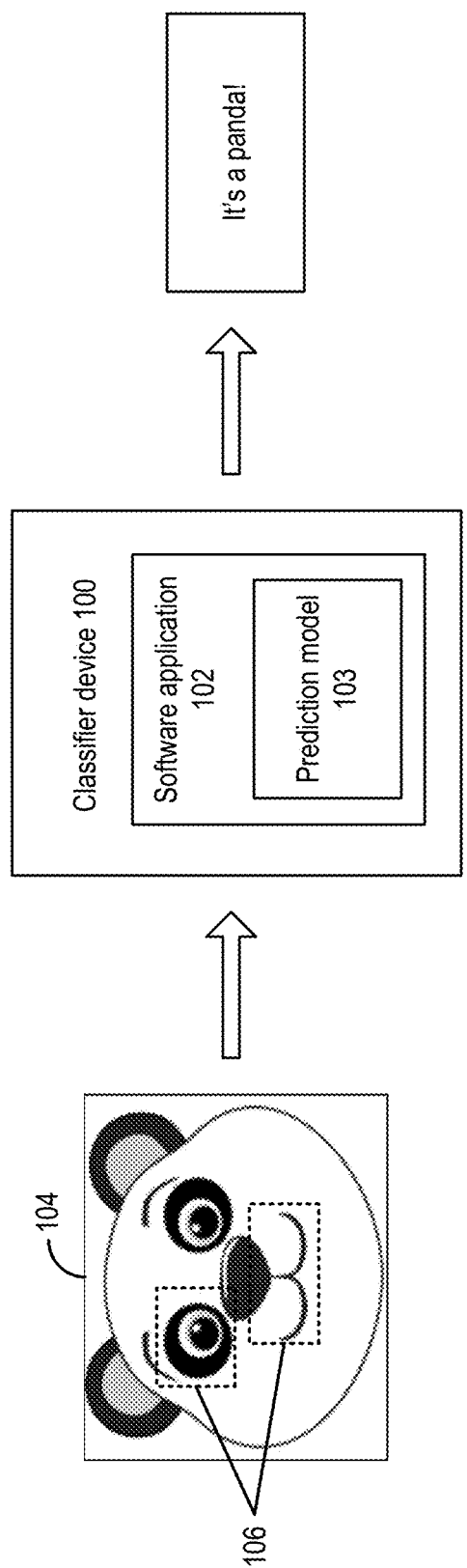
FIG. 1 illustrates an example a classifier device that uses techniques disclosed herein to process data.

Examples of the present disclosure relate to hardware circuits that implement a mathematical function, such as an activation function for neural network processing. In one example, a system comprises a controller and arithmetic circuits. The system may operate in a first mode of operation or in a second mode of operation. In the first mode of operation, the controller can provide the arithmetic circuits with a first set of function parameters of a mathematical function. The arithmetic circuits can compute a first approximation of the mathematical function at an input value using the first set of function parameters. In a second mode of operation, the controller can provide a second set of function parameters of the mathematical function. The arithmetic circuits can compute a second approximation of the function at the input value using the second set of function parameter. In addition, in the second mode of operation, the controller can also configured the arithmetic circuits to perform post-processing operation on the second approximation. One example of the post-processing operation includes quantization.

An artificial neural network (herein after "neural network") may include multiple processing nodes. The processing nodes can be divided into layers including, for example, an input layer, a number of intermediate layers (also known as hidden layers), and an output layer. Each processing node of the input layer receives an element of an input set, and scales the element with a weight to indicate the element's degree of influence on the output. The processing nodes in the intermediate layers may combine the scaled elements received from each processing node of the input layer to compute a set of intermediate outputs. For example, each processing node in the intermediate layers may compute a sum of the element-weight products, and then generate an intermediate output by applying an activation function to the sum. The output of the activation function, scaled by a weight indicating the sum's influence, can be post-processed (e.g., aggregated, averaged, filtered, sampled, etc.) to generate outputs of an intermediate layer. The outputs can be processed by subsequent intermediate layers or a subsequent output layer to generate a final output/decision of the artificial neural network.

To improve the speed of neural network processing, the computations of an artificial neural network can be performed using hardware components, such as a neural network processor. The neural network processor can include a systolic array which includes arithmetic circuits to perform arithmetic operations for a neural network layer to generate the element-weight products and the sums of the element-weight products. The neural network processor may also include hardware circuitries, such as multiplexor circuitries configured as a lookup table (LUT), to implement the activation function processing. For example, the lookup table can map a set of discrete candidate inputs (of an input range) to a set of discrete candidate outputs, with each candidate output representing a result of processing a corresponding candidate input with the activation function. A closest candidate input to an input can be determined, and a candidate output as an approximation of the activation function at the input can be selected from the LUT. The activation function approximation outputs (or the post-processed activation function approximation outputs) can be stored as outputs of the neural network layer, and can be provided to the systolic array as inputs for arithmetic operations of a next neural network layer.

To reduce the complexity of the arithmetic circuits of the systolic array and to improve the speed of the arithmetic operations, the neural network layer output (which can include the activation function approximation outputs or the post-processed activation function approximation outputs) can be quantized. For example, the activation function approximation outputs can be floating point numbers each of which is represented by a certain number of bits. Through quantization, the activation function approximation outputs can be converted into integer numbers represented by a smaller number of bits, and the quantized activation function approximation outputs can be stored as the neural network layer output. By reducing the number of bits, the volume of data to be processed by the systolic array can be reduced, which can facilitate storage. Moreover, the systolic array can be configured to process integer inputs having reduced number of bits, which can reduce the complexity of the systolic array and improve the speed of the arithmetic operations at the systolic array.

Although quantization of data can reduce the complexity of the systolic array and improve the speed of the arithmetic operations at the systolic array, the quantization adds latency to the overall neural network computations for a neural network layer. Moreover, for some applications the precision of activation function approximation can be reduced in exchange for increased speed of activation function processing. However, the aforementioned LUT arrangements do not provide flexibility for trading off precision of activation function approximation for increasing the speed of activation function approximation, to accommodate for the quantization latency and to improve the speed of the overall neural network computations.

Examples of the present disclosure relate to hardware implementation of mathematical functions, such as activation functions, which can be used for neural network processing. In one example, an apparatus, such as a neural network processor, comprises a controller and arithmetic circuits. The apparatus may operate in a first mode of operation or in a second mode of operation. In the first mode of operation, the controller can provide a first set of function parameters of a mathematic function to the arithmetic circuits, to enable the arithmetic circuits to compute a first approximation of the mathematical function at an input value. In a second mode of operation, the controller can provide the arithmetic circuits a second set of function parameters to compute a second approximation of the function at the input value. The second set of function parameters can be a subset of the first set of function parameters, and the second approximation may have a lower precision than the first approximation. In addition, the controller can also configure the arithmetic circuits to quantize the second approximation.

Compared with the aforementioned lookup table approach, examples of the prevent disclosure enable trade-off between precision and speed of activation function processing. For example, the first set of function parameters can include a set of Taylor series expansion coefficients associated with a base value, and the Taylor series expansion coefficients can be used in an extrapolation operation to compute an approximation of an activation function output. Using the entire set of Taylor series expansion coefficients to perform the extrapolation operation can achieve a higher precision of the approximation, but the extrapolation requires more time and more hardware resources, which increases the overall processing latency. On the other hand, using a subset of the set of Taylor series expansion coefficients to perform the extrapolation can reduce the precision of the approximation. However, in this case the extrapolation requires less time and hardware resources, and the overall processing latency can be reduced. Hence, by choosing between providing the set of Taylor series expansion coefficients and providing a subset of the set of Taylor series expansion coefficients to the arithmetic circuits to perform the approximation, a trade-off between precision and speed of activation function approximation can be made.

The capability of trading off between precision and speed of activation function approximation can be useful in many ways, such as load management, setting a quality of service (QoS), etc. For example, a neural network processor may be experiencing a very heavy computation work load. The neural network processor can enter the second mode of operation to shorten the processing time. When the work load reduces, the neural network processor can enter the first mode of operation to maximize the precision of the activation function processing. As another example, the neural network processor may be configured to prioritize the computations for certain applications to provide a predetermined level of QoS (e.g., to achieve a certain level of precision of activation function approximation). The neural network processor may prioritize applications that have smaller tolerance for imprecision and perform activation function processing for those applications in the first mode of operation. The neural network processor may also perform activation function processing for other applications having higher tolerance for imprecision in the second mode of operation.

In addition, by configuring the arithmetic circuits to perform both activation function processing and quantization, there is no need to store the activation function outputs at a temporary buffer before quantization. Instead, the arithmetic circuits can perform inline quantization of activation function outputs to, for example, quantize an activation function output right after the activation function output is generated. The elimination of the temporary storage of the activation function output prior to quantization can reduce the processing latency, which can further improve the speed and throughput of the overall neural network computations.

In the description herein, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 illustrates an example classifier device 100 that uses techniques disclosed herein to process data. Classifier device 100 can be, for example, a computing device operating a software application 102 and a prediction model 103 to predict information included in a data sequence, and perform a predetermined function based on the prediction. For example, classifier device 100 can be part of an image recognition service provided to identify certain objects (e.g., texts, a person, etc.) from an image. It is understood that the image recognition service is merely provided as an illustrative example, and that techniques disclosed herein can be used for other data processing applications including, for example, text-based data processing (e.g., processing of search queries), audio data processing, etc. Moreover, classifier device 100 may operate a number of different prediction models to process different input data, either in parallel or at different times.

In some examples, the image recognition service can be provided in a multi-tenant compute service system. The multi-tenant compute service system may typically include a plurality of servers that can host data and be used by multiple clients or organizations to run instances, such as virtual machine instances or bare-metal instances (e.g., operating systems that run directly on the server hardware). In most instances, such as bare-metal or virtual machine instances, a multi-tenant compute service system may be allocated to a client when the client needs them and decommissioned when they are no longer needed, such that the resources can be reallocated to other clients. In the present disclosure, the terms "tenant," "client," and "customer" may be used interchangeably, although such terms do not necessarily imply the existence of any particular business arrangement. The term "instance" may refer to, for example, an instance that is executed directly on server hardware or as a virtual machine. Different types of instances generally correspond to different hardware functions and/or arrangements of hardware (e.g., different amounts of available memory and/or processing hardware). In the example of FIG. 1, the multi-tenant compute service system may provide the image recognition service when the client needs it, and the service is decommissioned when it is no longer needed, such that the resources supporting the image recognition service (e.g., access to software application 102, and the underlying hardware resources for processing software application 102) can be reallocated to other clients. Different clients (or one client) may request application 102 to perform processing of different input data using the same or different prediction models including prediction model 103.

In the example of FIG. 1, software application 102 can receive pixel data of an image 104 from a user. Image 104 may include an array of pixels. Software application 102 can perform analysis on the pixel data, and predict one or more objects 106 depicted in image 104. The analysis may include, for example, comparing the pixel data against a set of predetermined features data. The predetermined features data may include data associated with a set of predetermined visual image features such as, for example, a nose object, a mouth object, etc. The predetermined features data may also include data associated with non-visual image features, or a combination of visual and non-visual image features. As to be discussed in more detail below, software application 102 may employ prediction model 103 to compute a set of scores based on the pixel data of image 104. The set of scores may represent, for example, the likelihood of image 104 including the image features represented by the features data. Software application 102 can then determine other information about the content of image 104 based on the scores. For example, based on the scores, software application 102 can determine that image 104 is an image of, for example, a panda, a cat, or other objects. The present disclosure provides examples of techniques to allow trade-off between speed and precision of operating prediction model 103, as to be discussed below.

Figure 2A:
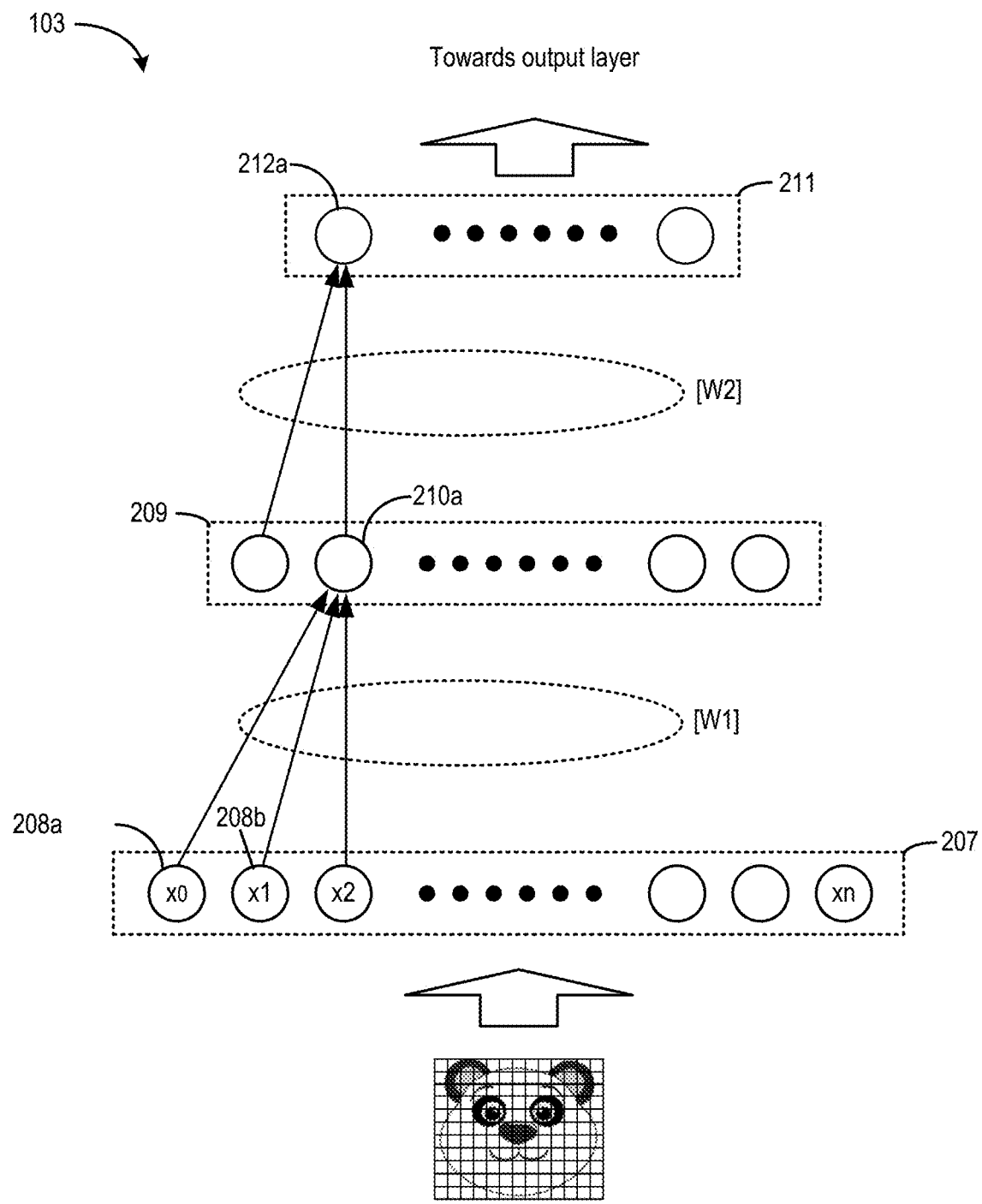
FIGS. 2A-2B are simplified block diagrams illustrating a prediction model and the computations that use techniques disclosed herein, according to certain aspects of the present disclosure.

Prediction model 103 can be in the form of an artificial neural network. The artificial neural network may include a plurality of processing nodes, with each processing node configured to process part of the input pixel data, or to further process the intermediate outputs from other processing nodes. FIG. 1 illustrates an example of prediction model 103 that uses techniques disclosed herein. In FIG. 1, prediction model 103 may be a multi-layer neural network such as a deep neural network (DNN), a convolutional neural network (CNN), etc. Prediction model 103 may include an input layer 207, a set of intermediate layers including intermediate layers 209 and 211, and an output layer (not shown in FIG. 2A). It is understood that prediction model 103 can also include other different types of neural networks including, for example, long short-term memory (LSTM), multilayer perception (MTP), multiscale densenet (MSD-NET), etc.

Layer 207 may process pixel data representing different portions of image 104. For example, in the example of FIG. 2A, layer 207 may process the pixel data of image 204. Each processing node of layer 207 is assigned to receive a pixel value (e.g., $x_0, x_1, x_2, \ldots x_n$) corresponding to a predetermined pixel within image 104, and transmit one or more weights with the received pixel value to layer 209. In a case where prediction model 203 is a DNN, each processing node of layer 207 can be assigned a set of weights defined based on a matrix W1. Each processing node of layer 207 can send the received pixel value and the assigned weights to each processing node of layer 209. In a case where prediction model 103 is a CNN, groups of the processing nodes of layer 207 may share a set of weights, and each group may send the set of weights and the pixel values received by the group of processing nodes to a single processing node of layer 209. Different neural network models may include different topologies (e.g., including different number of layers, different connections between layers, etc.), and/or include a different set of weights for each layer.

Layer 209 may process the scaled outputs from layer 207 to generate a set of intermediate outputs. For example, assuming processing node 210a of layer 209 is connected to n processing nodes in layer 207, processing node 210a may generate a sum of the scaled outputs received from layer 207 based on the following equation:

$$sum_{210a} = \sum_{i=0}^{n} (W1_i \times x_i) \qquad \text{(Equation 1)}$$

Here, $sum_{210a}$ represents a sum generated by processing node 210a. $W1_i \times x_i$ represents a scaling of a particular pixel value (e.g., $x_0$) with the associated weight (e.g., $W1_0$) by a processing node of layer 207. In a case where prediction model 103 is a DNN, each processing node of layer 209 may generate the sum based on the scaling of pixel values from each processing node of layer 207, and then generate a sum (e.g., $Sum_{210a}$) by summing the scaled pixel values. The sum may also represent a dot-product between an input vector comprising a number of elements (e.g., pixel values) and a weight vector (e.g., W1).

Figure 2B:
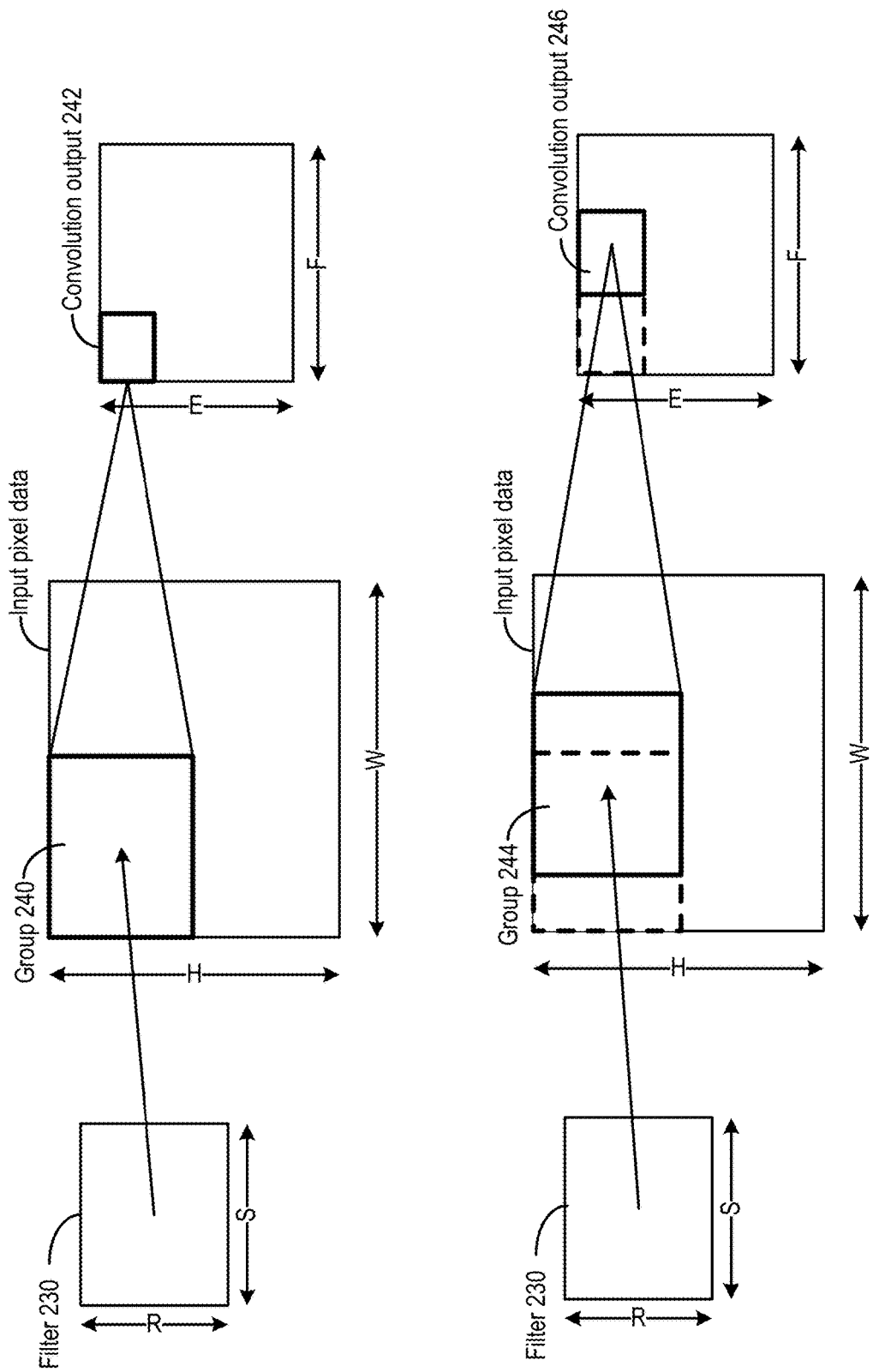

In a case where prediction model 103 is a CNN, each processing node of layer 209 may generate the sum based on the scaling of pixel values from a group of processing nodes of layers 207. The sum may represent a convolution result between a group of pixel values and a filter comprising the weight values. FIG. 2B illustrates an example of a convolution operation layer 209 may perform. In FIG. 2B, filter 230 may include a two-dimensional array of weights. The weights in filter 230 may represent a spatial distribution of pixels for certain features to be detected from the image. The two-dimensional array may have a height of R rows and a width of S columns, and is typically smaller than an input image with a height of H pixels and a width of W pixels. Each weight may be mapped to a pixel in a rectangular block of pixel values with the same R rows and S columns. A processing node of layer 209 (e.g., processing node 210a) can receive, from a group of processing nodes of input layer 207, a group 240 of pixel values corresponding to a first rectangular block of pixels from the input image, and generate a convolution output 242 based on a summation of multiplication results between each weight of filter 230 and each corresponding pixel in group 240 according to Equation 1, to generate a dot-product between a matrix represented by filter 230 and a matrix represented by group 240. Another processing node of layer 209 can also receive, from another group of processing nodes of input layer 207, a group 244 of pixel values corresponding to a second rectangular block of pixels from the input image, and generate a convolution output 246 based on a summation of multiplication results between each weight of filter 230 and each corresponding pixel in group 244 according to Equation 1, to generate a dot-product between the matrix of filter 230 and a matrix represented by group 240. In some examples, each convolution output in FIG. 2B (e.g., convolution output 242, convolution output 346, etc.) can correspond to the output of a processing node of layer 309. In some examples, the pixel data in the input image may be referred to as an input feature map to indicate that the pixels are processed by the same filter (or same sets of filters) corresponding to certain feature(s). The convolution outputs may be referred to as an output feature map to indicate that the output is the result of processing an input feature map with the filter.

As shown in FIG. 2B, the convolution operations can be arranged in a sliding-window such that the second rectangular block overlaps, or is otherwise adjacent to, the first rectangular block in the input image. For example, in the example of FIG. 2B, D may be a distance of stride (in pixel) of the sliding-window for each convolution operations, such that the block of pixels corresponding to group 244 may be situated at a distance D (in terms of pixels) from the block of pixels corresponding to group 240, and the next block of pixels may also be situated at the same distance D from group 244. Other processing node of layer 209 may also receive groups of pixels corresponding to other rectangular blocks and generate other intermediate outputs. The convolution outputs can be part of a convolution output array. The array of convolution outputs can have a smaller height and a smaller width than the input image. Rectangular blocks of the convolution outputs can be further grouped, and convolution operations can be performed at layer 211 between the groups of convolution outputs and another set of filter weights to generate another set of convolution outputs.

Referring back to FIG. 2A, one processing node of layer 209 may be configured to generate the convolution output elements of one convolution output array, and a set M of processing nodes of layer 209 can correspond to a set M of convolution output arrays. The processing node of layer 209 can also process each convolution output with an activation function to generate an activation output. The activation function may translate the convolution output into a decision of whether to forward the convolution output to intermediate layer 211 to influence the classifier decision (analogous to the firing of a biological neuron). An example of the activation function can be a rectified linear unit (ReLU) defined according to the following equation:

$$\text{ReLU}(y)=\max(0,y) \quad \text{(Equation 2)}$$

In addition to ReLU, other forms of activation function can also be used including, for example, a softplus function (which can be a smooth approximation of a ReLU function), a hyperbolic tangent function (tanh), an arc tangent function (arctan), a sigmoid function, a Gaussian function, etc.

A processing node of layer 209 (e.g., processing node 210a) may process the sum with the ReLU function to generate a first intermediate output based on the following equation:

$$\text{first\_intermediate\_output}_{210a}=\text{ReLU}(\text{Sum}_{210a}) \quad \text{(Equation 3)}$$

In some examples, prediction model 103 may include a pooling layer (not shown in FIG. 2A) to perform a pooling operation to reduce the size of the first intermediate outputs. For example, the pooling layer may perform a max pooling operation and forward a maximum intermediate output among a group of the first intermediate outputs (while discarding the rest of the intermediate outputs in the group) to layer 211. As another example, the pooling layer may perform an average pooling operation and forward an average intermediate output among the group of the first intermediate outputs to layer 211. In some examples, pooling operation is not performed, and the first intermediate outputs are forwarded directly to layer 211.

Layer 211 may further process the scaled intermediate outputs from layer 209 by, for example performing additional convolution operations based on different sets of filters. The outputs from each processing node of layer 211 may be forwarded to other higher intermediate layers, or to an output layer (not shown in FIG. 2A). The output layer may form an output vector representing, for example, a probability that certain features are included in image 104, and/or a probability that image 204 includes an image of a panda. For example, the output vector may be compared against a reference vector associated with a nose object of a panda, or a reference vector associated with a panda. A decision about whether image 104 is an image of a panda can be determined based on the comparison result.

As described above, a neural network computation may include multiplication and summation computations to compute weighted sums (e.g., Equation 1), followed by activation function processing (Equations 2 and 3) and optional pooling operations on the weighted sums. To reduce the data volume and complexity of the weighted sums computations, the input data to the weighted sums computations can be in quantized form to reduce the number of bits involved in the computations. Moreover, to improve the precision of the activation function processing and the resulting decision, the output of the weighted sums computations can be dequantized, and the dequantized weighted sums can be processed by the activation function to generate the intermediate outputs. Optional pooling operations can be performed to down-sample the activation function outputs. The outputs of the pooling operations (or the activation function outputs if no pooling is performed) can be quantized and provided to the next neural network layer as input data.

Figure 3A:
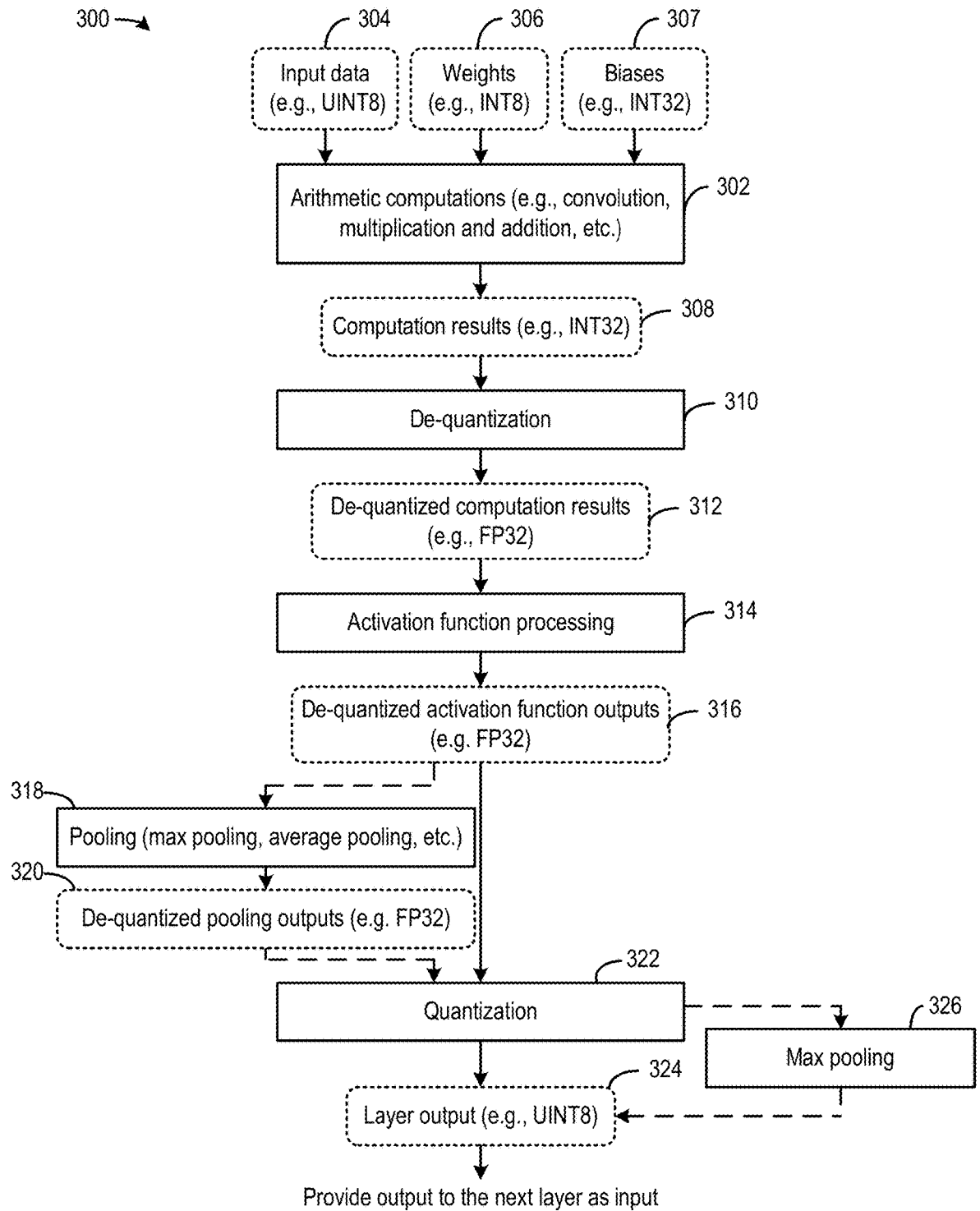
FIG. 3A-FIG. 3C illustrate computation operations for implementing the prediction model of FIGS. 2A-2E, according to certain aspects of the present disclosure.

FIG. 3A illustrates an example flowchart 300 of a sequence of operations for performing a neural network computation at a processing node of a neural network layer (e.g., processing node 210a of neural network layer 209) including the aforementioned quantization and dequantization operations. As shown in FIG. 3A, at operation 302, processing node 210a receives input data 304 as well as weights 306 and biases 307, and perform multiplication and summation computations to generate computation results 308. For example, processing node 210a may multiply input data 304 with weights 306 to generate multiples, and add biases 307 to the multiples to generate computation results 308. To reduce data volume and to reduce the complexity of the computations, input data 304 and weights 306 can be represented by unsigned 8-bit integers (uint8), whereas biases 307 can be signed 32-bit integers, and computation results 308 are also signed 32-bit integers. Computation results 308 can be dequantized in operation 310 to generate dequantized computation results 312. Dequantized computation results 312 can be in the form of 32-bit floating point numbers (FP32). The dequantized computation results 312 can be processed by an activation function in operation 314 to generate dequantized activation function outputs 316, which can be 32-bit floating point numbers. Dequantized activation function outputs 316 can be optionally processed by a pooling operation 318 (e.g., max pooling, average pooling, etc.) to generate dequantized pooling outputs 320, which can be 32-bit floating point numbers. Dequantized pooling outputs 320 (or dequantized activation function outputs 316 if no pooling operation is performed) can be quantized in quantization operation 322 to generate quantized layer output 324. Quantized layer output 324 can be unsigned 8-bit integers and can be provided as input data for the next neural network layer computations. Optionally, in a case where pooling operation 318 is not performed on de-quantized activation function outputs, a max pooling operation 326 can be performed on the outputs of quantization operation 322 to generate quantized layer output 324.

Figure 3B:
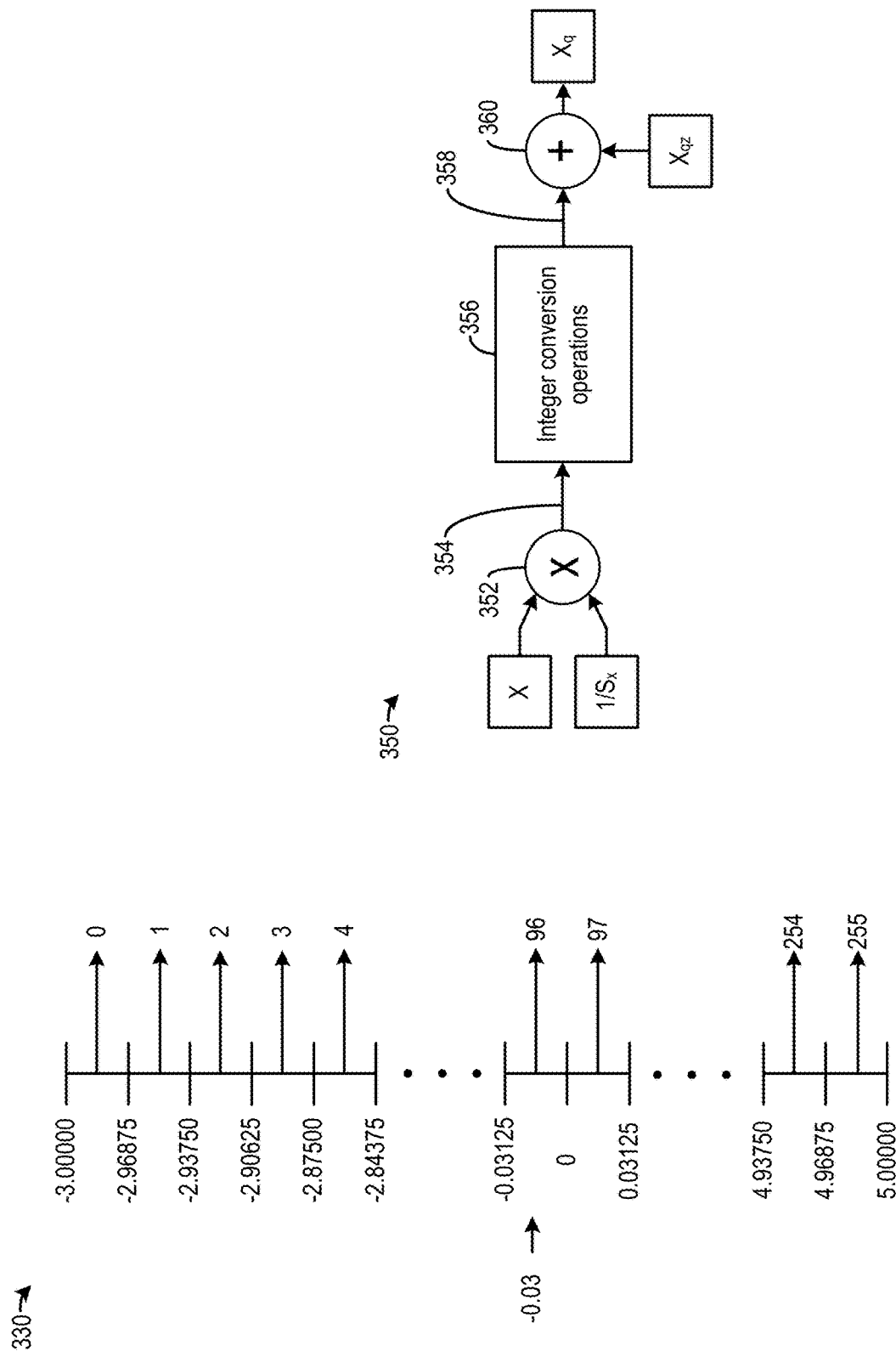

FIG. 3B illustrates an example of a quantization scheme to be used in quantization operation 332 of FIG. 3A. A quantization scheme can be defined by dividing a range of numbers (e.g., floating point numbers) into subranges, with each subrange being defined by a pair of quantization levels and associated with a quantized value. To perform quantization of an input value, the input value can be compared against a set of quantization levels to identify a subrange and the associated quantized value. Chart 330 on the left of FIG. 3B illustrates an example of such a quantization scheme. As shown in chart 330, a range of floating point numbers (which can be FP32) between −3.0 and +5 can be quantized to an unsigned 8-bit integer between 0 and 255. The range of floating point numbers can be divided into 256 subranges, with each subrange associated with a pair of quantization levels. To perform quantization of an input value of, for example, −0.03, the input value can be compared against the quantization levels to determine that the input value is within the subrange between −0.03125 and 0, and the quantized value 96 of that subrange can represent the quantized value of −0.03.

In some examples, other than comparing the input values against a set of quantization levels to identify the quantized value, the quantization scheme can also be implemented based on the following equation:

$$X_q = X_{qz} + \text{int}\left(\frac{1}{S_X}X\right) \tag{Equation 4}$$

Figure 3C:
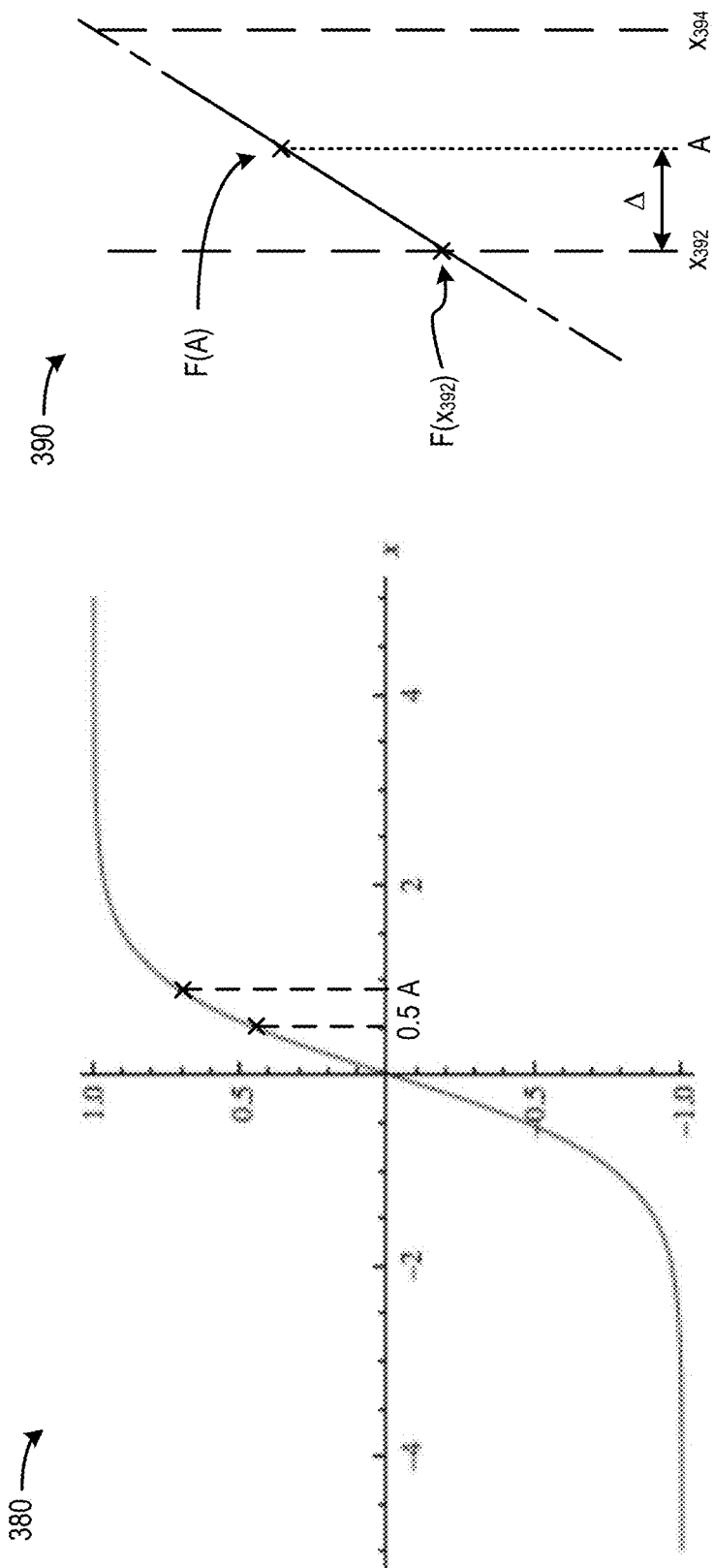

In Equation 4, $X_q$ represents the quantized value (e.g., 0, 1, . . . 255 in chart 330), whereas $X_{qz}$ can represent an integer which can be one of the quantized values. As discussed in more details below, $X_{qz}$ can be a quantized value offset used to offset the quantized values so that a zero input value can be quantized to become zero. Moreover, $S_X$ is a floating point scaling factor representing a ratio between the range of input values and the range of quantized values. For example, in chart 330, $S_X$ equals 1/(5−(−3))/256 or 1/32. Moreover, X is the floating point input value to be quantized, whereas into represents a floating point to integer conversion operation. The floating point to integer conversion operation may include, for example, a rounding operation, a floor operation, etc. To perform quantization of an input value X, the input value can be multiplied with a reciprocal value of $S_X$ (1/$S_X$) to obtain a multiple. A floor operation can be performed on the multiple to find the greatest integer that is less than or equal to the multiple. The floored multiple can then be added to $X_{qz}$ to determine the quantized value $X_q$. Arithmetic datapath 350 on the right of FIG. 3C illustrates an example of implementing the quantization scheme of chart 330 based on Equation 4. As shown in FIG. 3C, a floating point multiplier 352 can be provided to perform floating point multiplication between 1/$S_X$ and X to obtain a multiple 354. Integer conversion operation 356 can perform a floating point to integer conversion operation on multiple 354. In a case where a ceiling operation is performed, integer conversion operation 356 can set the mantissa of multiple 354 to zero, and the floating point number having the mantissa zeroed can be converted from the floating point format to the integer format, to obtain integer 358. In a case where a rounding operation is performed, integer conversion operation 356 can determine whether the most significant bit (MSB) of mantissa (after the sign bit) is one or zero. If the MSB is one, integer conversion operation 356 can zero out the mantissa, convert the floating point number having the mantissa zeroed to the integer format, and add one to the integer to obtain integer 358. If the MSB is zero, integer conversion operation 356 can perform the same flooring operation to obtain integer 358. An adder 360 can be provided to add integer 358 to $X_{qz}$ to obtain the quantized value $X_q$.

Referring back to chart 330, a zero input value is quantized to be 96. The quantization of a zero input value into an non-zero value may be undesirable. For example, in a case where a zero activation function output is quantized into a non-zero value and provided to the neural network processing node of the next layer, the neural network processing node may perform a multiplication operation on the non-zero value. On the other hand, if a zero quantized value is provided to the neural network processing node, the neural network processing node can skip the multiplication operation by detecting that one of the inputs to the multiplication operation is zero and the multiple must be zero, to conserve power and to speed up the computations. Therefore, it is desirable to quantize a zero value into a zero value. Referring back to Equation 4, to obtain zero quantized value ($X_q$) from a zero input value (X), $X_{qz}$ can be set to zero.

A dequantization scheme can also be performed based on chart 330 and Equation 4. For example, to perform dequantization of a quantized value, the subrange of the quantized value can be identified, and one of the quantization levels that define the subrange can be identified as the dequantized value. For example, referring to chart 330, a quantized value of 96 can be dequantized as 0. The dequantization scheme can also be performed based on the following equation derived from Equation 4:

$$X = S_X(X_q - X_{qz}) \tag{Equation 5}$$

In Equation 5, X represents the dequantized value, whereas $S_X$ is the scaling factor, $X_q$ is the input quantized value, and $X_{qz}$ is the quantized value offset as described above with respect to Equation 4.

FIG. 3C illustrates an example of an activation function which can be used for activation function processing operation 314 of FIG. 3A, following which quantization operation 322 can be performed based on Equation 4 as described above. Graph 380 on the left illustrates an example of a sigmoid function F(x) which can be used as an activation function. Sigmoid function F(x) can be defined according to the following equation:

$$F(x) = \frac{e^x}{1+e^x} \tag{Equation 6}$$

In Equation 6, $e^x$ refers to an exponential function. The sigmoid function can accept an infinite input range, but as shown in FIG. 3C, for an input larger than 3 or less than −3, the output of the sigmoid function is essentially flat and does not change with the input.

There are different ways to compute the value of F(x) for a particular value of x. In one example, the value of exponential function $e^x$ of the numerator can be computed, based on which the denominator 1+$e^x$ can also be computed, followed by the ratio between the numerator and the denominator. In another example, the values of the sigmoid function at a plurality of input boundary values (e.g., at x=0.5) can be precomputed and stored in a mapping table. For an input that matches one of the input boundary values, a value of F(x) can be retrieved from the mapping table based on the matching input boundary value. For an input (denoted as 'A' in FIG. 3C) that does not match any of the input boundary values, a value of F(x) for that input can be computed based on a process of extrapolation.

Graph 390 of FIG. 3C illustrates an example process of extrapolation to estimate the value of F(x) at input A. As shown in graph 390, two input boundary values (denoted as "$x_{392}$" and "$x_{394}$") that define an input subrange including input A can be determined. The value of F(x) at input A can be extrapolated from the value of F(x) at one of input boundary values $x_{392}$ or $x_{394}$ which acts as a base value. For example, to extrapolate from the base value of input boundary value $x_{392}$, a difference $\Delta$ can be determined between input A and input boundary value $x_{392}$. In addition, a set of Taylor series expansion coefficients of function F(x) evaluated at input boundary value $x_{392}$ can also be precomputed or retrieved from the mapping table. The value of F(x) at input A can be approximated based on a Taylor series expansion based on the following equation:

$$\text{Approx. } F(A) = F(x_{392}) + \sum_{n=1}^{\infty} \left( \frac{S^n(x_{392})}{n!} \times \Delta^n \right) \quad \text{(Equation 7)}$$

In Equation 7, "n!" represents a factorial of n, "$F^n(x_{392})$" represents an n-th degree derivative of F(x) evaluated at input boundary value $x_{392}$, whereas $\Delta^n$ refers to raising the difference (between input A and input boundary value $x_{392}$) to the power n.

In some examples, a Taylor series expansion up to the third degree (n=3) may provide sufficient accuracy in approximating the value of F(A) (the value of F evaluated at input A). Equation 8 can be rewritten as follows:

$$\text{Approx. } F(A) = \quad \text{(Equation 8)}$$
$$F(x_{392}) + F^1(x_{392}) \times \Delta + \frac{F^2(x_{392})}{2} \times \Delta^2 + \frac{F^3(x_{392})}{6} \times \Delta^3$$

Equation 8 can be further rewritten as follows:

$$\text{Approx. } F(A) = \quad \text{(Equation 9)}$$
$$F(x_{392}) + \left( \left( \frac{F^3(x_{392})}{6} \times \Delta + \frac{F^2(x_{392})}{2} \right) \times \Delta + F^1(x_{392}) \right) \times \Delta$$

In addition, the value of F(x) at input A can also be estimated based on a second degree Taylor series expansion based on the following equation:

$$\text{Approx. } F(A) = \quad \text{(Equation 10)}$$
$$F(x_{392}) + \left( \frac{F^2(x_{392})}{2} \times \Delta + F^1(x_{392}) \right) \times \Delta$$

Compared with the third degree Taylor series expansion of Equation 9, the second degree Taylor series expansion of Equation 10 provides a less precise approximation of F(A), but the second degree Taylor series expansion of Equation 10 involves fewer computations and can be computed in a shorter time than the third degree Taylor series expansion of Equation 9.

As to be described in more details below, a configurable arithmetic circuit is provided to perform the activation function processing operations. The arithmetic circuit can be configured, in a first operation mode, to perform an approximation of an activation function based on the a predetermined degree (e.g., a third degree) Taylor series expansion. The arithmetic circuit can also be configured, in a second operation mode, to perform a lower degree (e.g., second degree) Taylor series expansion, followed by a quantization operation based on Equation 4. Such arrangements allow trade-off between the precision of activation function approximation and the overall speed of neural network computation.

Figure 4A:
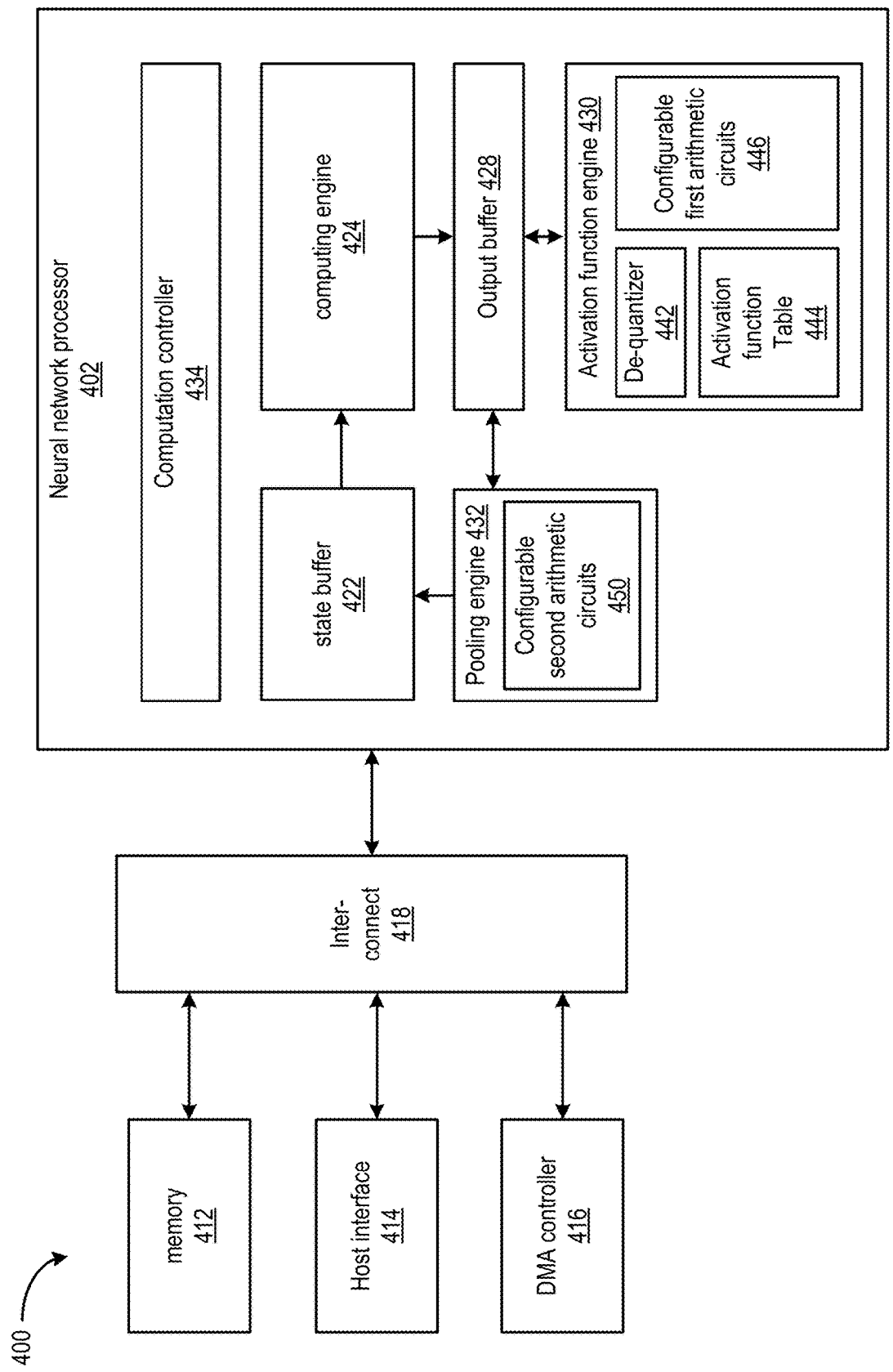
FIGS. 4A-4C illustrate an example neural network processor and its operations, according to certain aspects of the present disclosure.

FIG. 4A shows an apparatus 400 according to some embodiments of the present disclosure. Apparatus 400 may be part of a computer system, e.g., a host server. Apparatus 400 may be part of a multi-tenant compute service system and can communicate with a host device (not shown in FIG. 4A) to provide computing and memory resources for a computing service. For example, referring back to FIG. 1, apparatus 400 may provide computing and memory resources for computations with prediction model 103. A host device can operate software application 102 and communicate with apparatus 400 to perform one or more image recognition tasks based on computations with prediction model 103. The host device may transmit multiple image data sets associated with multiple contexts, and provide the multiple image data sets to apparatus 400, which can generate multiple outputs to predict, for example, whether each of the multiple image data sets includes a predetermined object.

In the example of FIG. 4A, apparatus 400 may include a neural network processor 402 coupled to memory 412, a direct memory access (DMA) controller 416, and a host interface 414 via an interconnect 418. As to be discussed in more details, neural network processor 402 can provide the computing resources to support the computations with prediction model 103. Neural network processor 402 can include an integrated circuit such as, for example, a System-on-Chip (SoC). Memory 412 may be configured to store the instructions, input data (e.g., pixel groups 249 and 244 of FIG. 2B) and the weights (e.g., filter 230) received from the host device. Memory 412 may also be configured to store the output of neural network processor 402 (e.g., convolution outputs 242 and 246 of FIG. 2B). Memory 412 may include any suitable memory, e.g., dynamic random access memory (DRAM), synchronous DRAM (SDRAM), double data rate DRAM (DDR DRAM), storage class memory (SCM), flash memory devices, etc.

DMA controller 416 may be configured to perform DMA operations to transfer data between neural network processor 402 and the host device. For example, as discussed above, the host device can store the instructions, input data, and the weights at memory 412. The host device can provide the memory addresses for the stored instructions, data and weights to neural network processor 402 (e.g., in the form of memory descriptors). Neural network processor 402 can then obtain the stored instructions, data, and weights based on the memory addresses provided by the host device. Neural network processor 402 can also store the results of computations (e.g., one or more image recognition decisions) at memory 412, and provide the memory addresses for the stored results to the host device.

Host interface 414 may be configured to enable communication between the host device and neural network processor 402. For example, host interface 414 may be configured to transmit the memory descriptors including the memory addresses of the stored data (e.g., input data, weights, results of computations, etc.) between the host device and neural network processor 402. Host interface 414 may include, for example, a peripheral component interconnect express (PCIe) interface or any suitable interface for communicating with the host device.

Neural network processor 402 can provide the computing resources to support the computations with one or more instances of prediction model 103. As shown in FIG. 3A, neural network processor 402 may include a state buffer 422, a computing engine 424, an output buffer 428, an activation function engine 430, a pooling engine 432, and a computation controller 434.

State buffer 422 may be configured to provide caching of data used for computations at computing engine 424. The data cached at state buffer 422 may include, for example, the input data, weights, and biases acquired from memory 412, as well as intermediate outputs of computations at computing engine 424. The input data, weights, and bias can be integers (e.g., 8-bit unsigned input data weights, and 32-bit signed integers for biases). The caching can reduce the effect of memory access bottleneck (e.g., caused by the latencies at memory 412, DMA controller 416, interconnect 418, etc.) on the performance of computing engine 424. State buffer 422 can be an on-chip memory device and may include, for example, static random access memory (SRAM).

State buffer 422 can be controlled by computation controller 434 to fetch weights, bias, and input data to computing engine 424. Computing engine 424 can perform neural network computations based on the weights, bias, and input data to generate weighted sums. Computing engine 424 may include a set of circuitries configured to perform one or more arithmetic operations involved in neural network computations. For example, computing engine 424 may include a set of multipliers to perform the scaling of input data with associated weights, and a set of adders to generate a sum of the results of multiplications representing dot-products and convolution results, as discussed above. As described above, the input data, weights and bias can be in the form of unsigned 8-bit integers, and the set of circuitries may be designed/configured to perform the arithmetic operations on unsigned 8-bit integers, which can reduce the complexity and latency of the arithmetic operations. The weighted sums can be collected and accumulated at output buffer 428 to generate intermediate output data. Output buffer 428 can provide the intermediate output data to activation function engine 430 and to pooling engine 432 for post-processing. The post-processed intermediate output data can be stored in state buffer 422, which can fetch the post-processed intermediate output data, as well as a new set of weights and bias, to computing engine 424 to perform neural network computations for the next neural network layer.

Activation function engine 430 may include a dequantizer 442, an activation function table 444, and configurable arithmetic circuits 446. Dequantizer 442 can include arithmetic circuits (e.g., multipliers and adders) to perform dequantization of the intermediate output data based on Equation 5. Activation function table 444 can store function parameters for approximating the activation function processing of the dequantized intermediate output data. The function parameters may include, for example, Taylor series expansion coefficients of an activation function evaluated at different boundary values. The function parameters can be provided by a software that interfaces with neural network processor 402 (e.g., software application 102 of FIG. 1).

Activation function table 444 can be controlled, for each intermediate output, to provide a set of function parameters to configurable arithmetic circuits 446. Arithmetic circuits 446 can be configured, in a first mode of operation, compute a higher degree (e.g., a third degree, a second degree, etc.) Taylor series expansion based on the function parameters to approximate the activation function processing of an intermediate output at a higher precision. Moreover, arithmetic circuits 446 can be configured, in a second mode of operation, compute a lower degree (e.g., a second degree, a first degree, etc.) Taylor series expansion based on the function parameters to approximate the activation function processing of an intermediate output at a lower precision. In the second mode of operation, arithmetic circuits 446 can also be configured to quantize the activation function processing results (e.g., based on Equation 5). Activation function engine 430 can store the original activation function processing results (from the first mode of operation) or the quantized activation function processing results (from the second mode of operation) at output buffer 428, which can forward the original or quantized activation function processing results, or down-sampled data, to pooling engine 432. Additional details of configurable arithmetic circuits 446 are provided in FIG. 5 and FIG. 6.

Pooling engine 432 includes configurable second arithmetic circuits 450 which can be configured, at different times, to perform a pooling operation, a quantization operation, or a forwarding operation. For a pooling operation, second arithmetic circuits 450 can be configured in a loop configuration to perform various pooling operations including, for example, max pooling, average pooling, etc., to down sample the activation function processing results provided by output buffer 428, and write the down-sampled data back to output buffer 428. For a quantization operation, second arithmetic circuits 450 can be configured to perform addition and multiplication operations based on, for example, Equation 4, to quantize the down-sampled data (e.g., provided by pooling engine 432 during the pooling operation) or the original activation function processing results provided by output buffer 428, and write the quantized data back to output buffer 428. Further, for a forward operation, pooling engine 432 can receive quantized data from output buffer 428 and store the quantized data at state buffer 422.

Computation controller 434 can control and coordinate the operations at each of state buffer 422, computing engine 424, output buffer 428, activation function engine 430, and pooling engine 432 to perform neural network computations. For example, computation controller 434 can control state buffer 422 to pre-fetch weights and biases of a neural network layer (and input data for the input neural network layer) from memory 412, and fetch the weights, biases, and input data for a neural network layer to computing engine 424 to perform computations for that neural network layer. Computation controller 424 can also configure arithmetic circuits 446 to operate in the first mode of operation (to perform a higher precision activation function approximation operation) or in the second mode of operation (to perform a lower precision activation function approximation operation followed by quantization). In a case where computation controller 424 configures arithmetic circuits 446 to operate in the first mode of operation, computation controller 424 also configures second arithmetic circuits 450 of pooling engine 432 to perform quantization. In a case where computation controller 424 configures arithmetic circuits 446 to operate in the second mode of operation to perform quantization, computation controller 424 can also configure second arithmetic circuits 450 of pooling engine 432 not to perform quantization on the already-quantized data from output buffer 428. In both cases, computation controller 424 can configure second arithmetic circuits 450 to perform pooling operations.

Figure 4B:
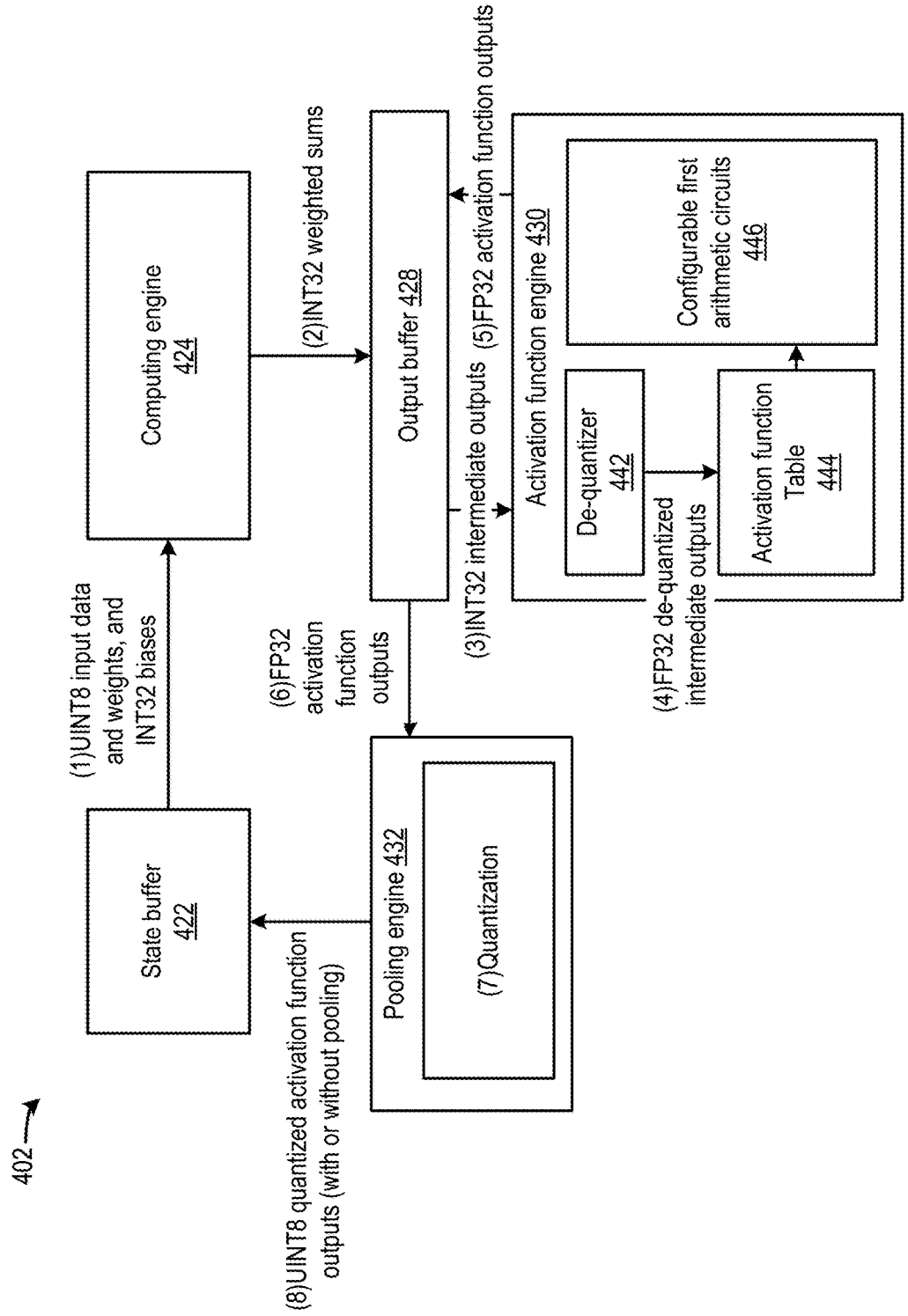
Figure 4C:
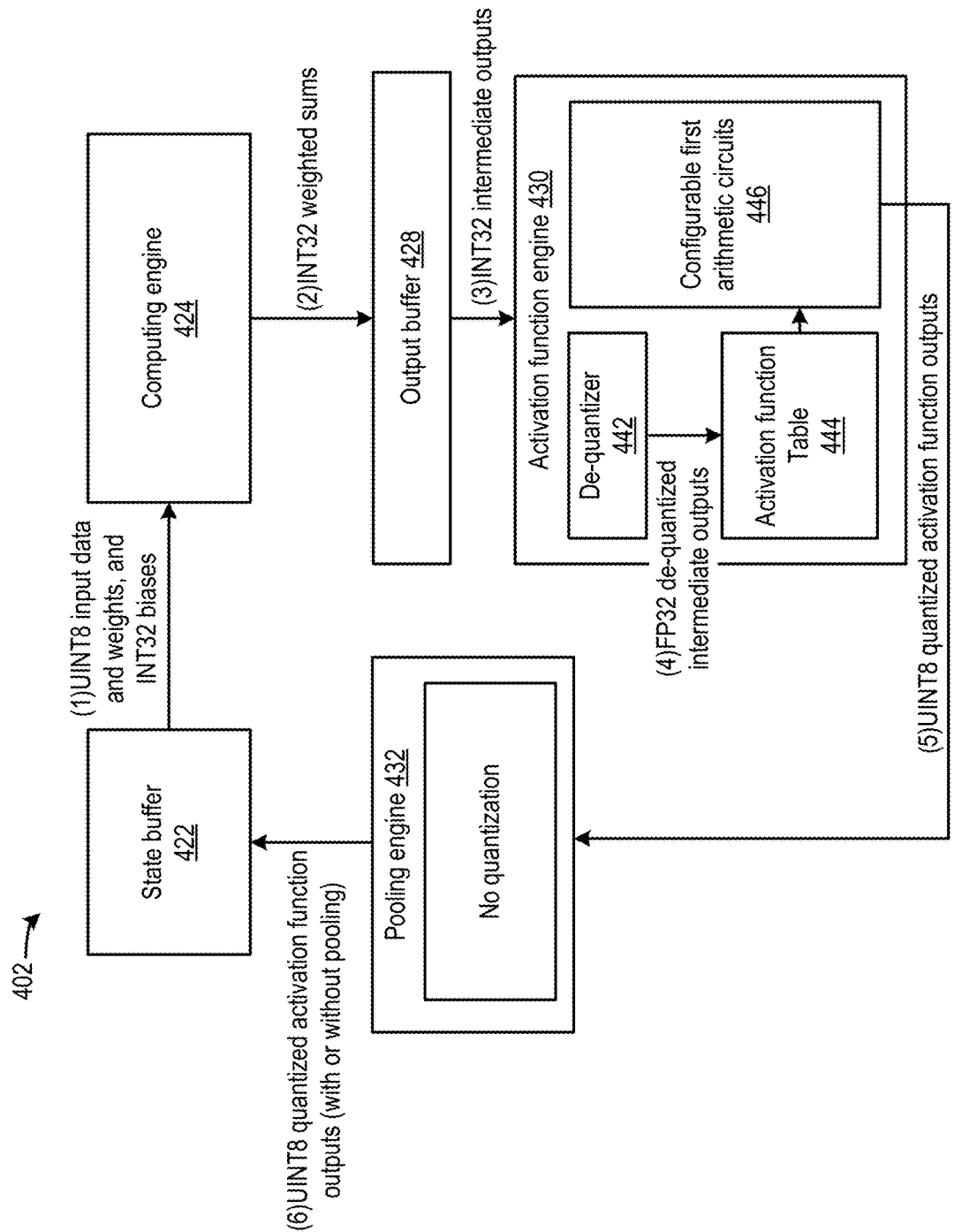

FIG. 4B and FIG. 4C illustrate examples of sequences of operations at neural network processor 402 for a neural network computation under different modes of operations of arithmetic circuits 446. In FIG. 4B, arithmetic circuits 446 of activation function engine 430 can be configured by computation controller 434 to operate in the first mode of operation and not to perform quantization, whereas second arithmetic circuits 450 of pooling engine 432 can be configured by computation controller 434 to perform quantization. To begin the neural network computation, in step (1), state buffer 422 fetches 8-bit unsigned integer (UINT8) input data and weights, as well as 32-bit integer (INT32) biases to computing engine 424. Computing engine 424 then performs the weighted sums computations to obtain INT32 weighted sums and store the INT32 integer weighted sums at output buffer 428, in step (2). Output buffer 428 collects and accumulates the weighted sums to generate INT32 intermediate outputs, and sends the INT32 intermediate outputs to activation function engine 430, in step (3). The INT32 intermediate outputs can be dequantized by dequantizer 442 into 32-bit floating point numbers (FP32), in step (4). Moreover, approximations of activation function processing of the FP32 intermediate outputs (e.g., based on Taylor series expansion) can be computed using arithmetic circuits 446 and based on the function parameters stored in activation function table 444 identified for each FP32 intermediate output. A higher degree Taylor series expansion (e.g., second degree, third degree, etc.) can be computed, which can result in a higher precision, but the computation requires more time and more hardware resources. The FP32 activation function outputs can be written back to output buffer 428, in step (5). In a case where no pooling is to be performed at pooling engine 432, output buffer 428 can collect a certain number of original activation function outputs and provide the collected activation function outputs to pooling engine 432 to perform quantization, in step (6). Pooling engine 432 can quantize the outputs and convert the outputs to unsigned 8-bit integers, in step (7). Pooling engine 432 can forward the UINT8 quantized activation function outputs to state buffer 422 for storage as input data for the next neural network layer computations, in step (8).

In a case where a pooling operation is to be performed, output buffer 428 can send the dequantized FP32 activation function outputs to pooling engine 432. Pooling engine 432 can perform various kinds of pooling operations (e.g., max pooling, average pooling, etc.) to down-sample the floating point activation function outputs, and write the down-sampled activation function outputs back to output buffer 428. Output buffer 428 then sends the down-sampled activation function outputs back to pooling engine 432 (in step (6)), which can quantize the down-sampled outputs in step (7) and forward the UINT8 down-sampled outputs to state buffer 422 in step (8).

In the arrangements of FIG. 4B, arithmetic circuits 446 can perform the approximation of activation function processing at a higher precision (e.g., by computing a higher degree Taylor series expansion), but the higher precision is achieved at the expense of larger processing latency. For example, arithmetic circuits 446 may require additional processing time to perform the approximation. Moreover, additional latency is incurred when the activation function outputs are stored at output buffer 428, and the output buffer 428 may wait until a certain number of activation function outputs is stored before sending the outputs to pooling engine 432 to perform quantization, and the quantization is performed in batches as a result. The storage time at output buffer 428 as well as the wait time incurred in the batch quantization can add significant latency to the overall neural network computation.

In FIG. 4C, arithmetic circuits 446 of activation function engine 430 can be configured by computation controller 434 to operate in the second mode of operation to perform quantization, whereas second arithmetic circuits 450 of pooling engine 432 can be configured by computation controller 434 not to perform quantization. To begin the neural network computation, in step (1), state buffer 422 fetches UINT8 input data and weights, as well as INT32 biases to computing engine 424. Computing engine 424 then performs the weighted sums computations to obtain INT32 weighted sums and store the INT32 weighted sums at output buffer 428, in step (2). Output buffer 428 accumulates the INT32 weighted sums to generate INT32 intermediate outputs, and forwards the INT32 intermediate outputs to activation function engine 430, in step (3). The INT32 intermediate outputs can be dequantized by dequantizer 442 into dequantized FP32 intermediate outputs, in step (4). Moreover, approximations of activation function processing of the FP32 intermediate outputs (e.g., based on Taylor series expansion) can be computed using arithmetic circuits 446 and based on a subset of function parameters stored in activation function table 444 identified for each FP32 intermediate output. Compared with the arrangements in FIG. 4B, a lower degree Taylor series expansion (e.g., first degree, second degree, etc.) can be computed, which can result in a lower precision, but the computation requires less time and less hardware resources. In addition, arithmetic circuits 446 can also perform quantization on the floating point activation function output and integer conversion to generate unsigned 8-bit integers. The 8-bit integer activation function outputs can be sent to pooling engine 432, in step (5). Pooling engine 432 does not perform quantization. In a case where no pooling operation is to be performed, pooling engine 432 can forward the 8-bit integer activation function outputs to state buffer 422 for storage as input data for the next neural network layer computation, in step (6). In a case where max pooling operation is to be performed, pooling engine 432 can perform the max pooling operation to down-sample the UINT8 quantized activation function outputs, and forward the UINT8 down-sampled outputs to state buffer 422 in step (6).

Compared with the arrangements in FIG. 4B, the arrangements in FIG. 4C can speed up the overall neural network computation in various ways. First, the computation of the lower precision activation function approximations requires less time. Second, arithmetic circuits 446 can perform inline quantization and integer conversion of the activation function outputs, and feed the quantized integer outputs directly to pooling engine 432 for storage at state buffer 422. Compared with the arrangements in FIG. 4B, the time spent in writing the activation function outputs back to output buffer 428 can be eliminated. The wait time incurred by output buffer 428 in collecting the activation function outputs and forwarding the outputs to pooling engine 432 for quantization can also be eliminated.

Figure 5A:
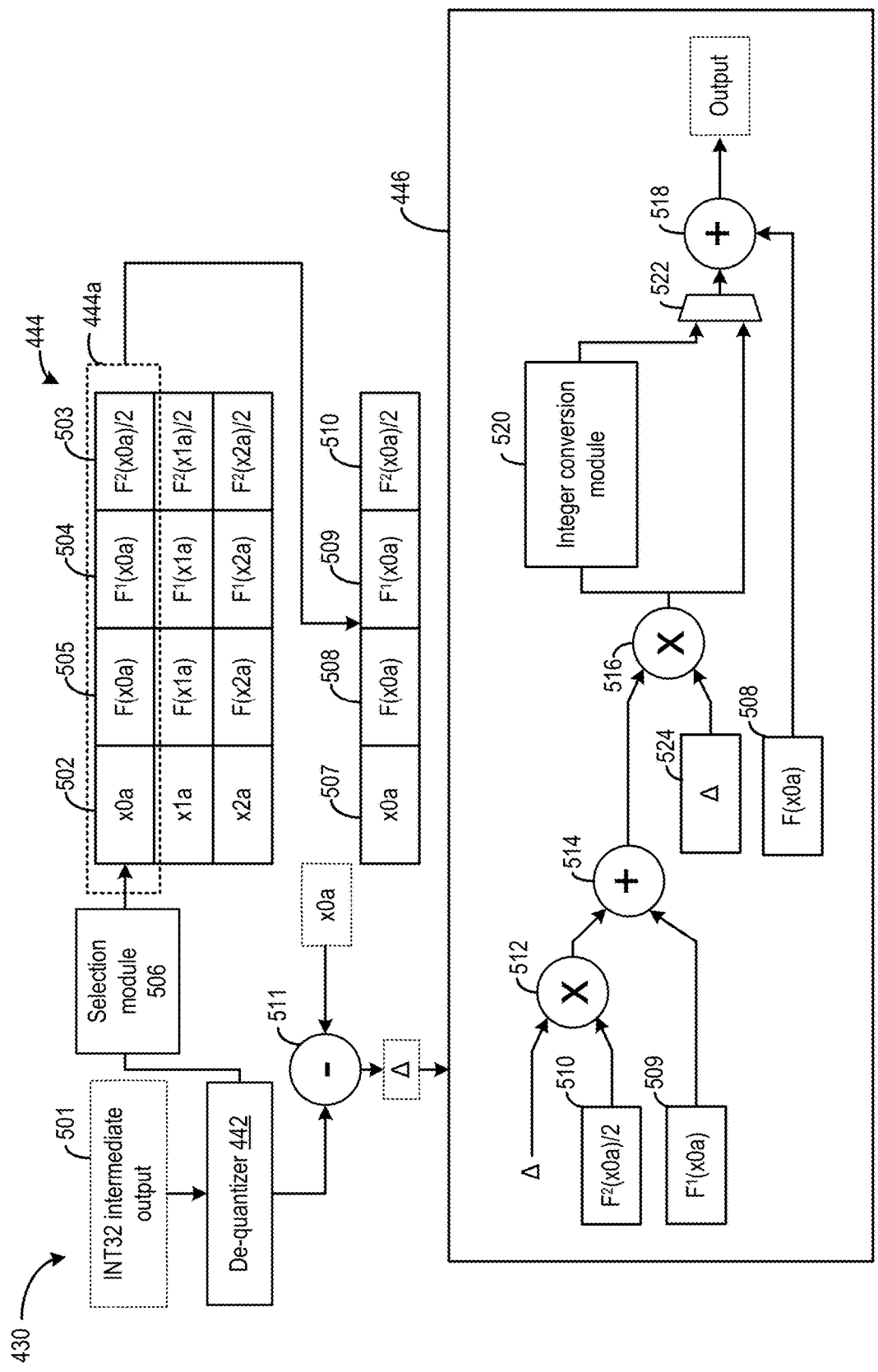
FIG. 5A and FIG. 5B illustrate an example of an activation function engine of the example neural network processor of FIG. 4A, according to certain aspects of the present disclosure.
Figure 5B:
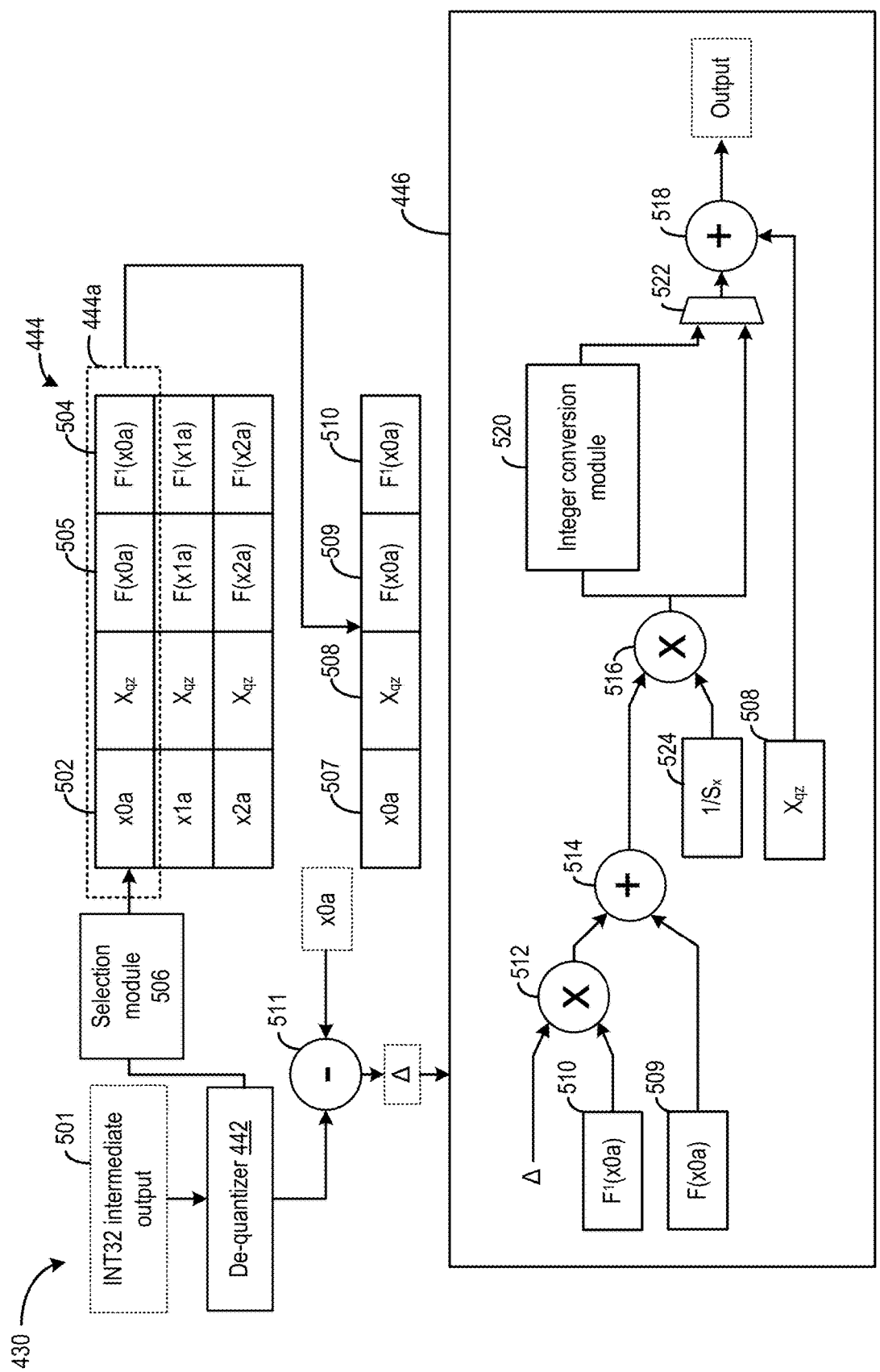

FIG. 5A and FIG. 5B illustrate an example of an example of internal components of activation function engine 430, including dequantizer 442, activation function table 444, and configurable arithmetic circuits 446. As shown in FIG. 5A and FIG. 5B, activation function table 444 may store a plurality of buckets including bucket 444a. Each bucket includes multiple fields to store a boundary value 502 (e.g., "x0a"), together with parameters 503, 504, and 505. When activation function engine 430 receives an INT32 intermediate output 501, dequantizer 442 can dequantize the INT32 intermediate output based on the techniques described above (e.g., based on Equation 5) and convert the intermediate output into FP32 format. A selection module 506 can compare the FP32 intermediate output against the boundary values stored in activation function table 444 to identify, for example, the closet boundary value to the FP32 intermediate output. In the examples of FIG. 5A and FIG. 5B, the boundary value "x0a" is identified as the closest boundary value, and bucket 444a is selected. The content of bucket 444a can be stored at a set of registers 507, 508, 509, and 510, and the output of registers 507-510 can be provided to arithmetic circuits 446. In addition, a subtractor 511 is provided to determine a difference ("Δ") between the boundary value and the FP32 intermediate output is determined. The difference Δ is also provided to arithmetic circuits 446.

Depending on an operation mode, each bucket may store different parameters 503-505. In a first operation mode, as shown in FIG. 5A, each bucket can store a first function parameter 503, a second function parameter 504, and a third function parameter 505. First function parameter 503 can represent a value of a function F evaluated at the boundary value (F(x0a)). Second function parameter 504 can represent a first degree Taylor series coefficient of function F evaluated at the boundary value ($F^1$(x0a)). Third function parameter 505 can represent a second degree Taylor series coefficient of function F evaluated at the boundary value ($F^2$(x0a)/2). Moreover, in a second operation mode, as shown in FIG. 5B, each bucket can store first function parameter 503 (F(x0a)) and second function parameter 504 ($F^1$(x0a)). Each bucket can also store the quantized value offset $X_{qz}$. As to be discussed in more details below, in the first mode of operation, the parameters stored in a selected bucket (e.g., bucket 444a) can be provided to arithmetic circuits 446 to perform a second degree Taylor series expansion of the function F, whereas in the second mode of operation, the parameters stored in the selected bucket can be provided to arithmetic circuits 446 to perform a first degree Taylor series expansion of the function F followed by a quantization operation.

The switching of the function parameters stored in activation function table 444 can be performed by dynamically updating the function parameters stored in those fields of activation function table 444 when transitioning between the two modes of operations. The updating can be performed by the software that interfaces with neural network processor 402 (e.g., software application 102), a management software that manages tenants' access to neural network processor 402, a load management software, etc. For example, the load management software may detect a heavy load condition on neural network processor 402, and can update the function parameters stored in the fields of activation function table 444 to switch activation function engine 430 between the first mode and the second mode of operations.

Referring to FIG. 5A and FIG. 5B, arithmetic circuits 446 may include a first multiplier 512, a first adder 514, a second multiplier 516, a second adder 518, an integer conversion module 520 to perform quantization and integer conversion operations on the output of second multiplier 516, and a multiplexor 522 to selectively forward, based on the operation mode, the output of integer conversion module 520 or the unconverted output of second multiplier 516 to second adder 518. Each of first multiplier 512, first adder 514, and second adder 518 is hardwired to, respectively, registers 510, 509, and 508. Second multiplier 516 is also hardwired to a register 524. In some examples, first multiplier 512 and first adder 514 can be part of a first fused multiplier adder (FMA) unit, whereas second multiplier 516 and second adder 518 can be part of a second FMA unit.

In the first mode of operation, as shown in FIG. 5A, register 510 can store a second degree Taylor series coefficient (e.g., $F^2$(x0a)/2, $F^2$(x1a)/2, $F^2$(x2a)/2, etc.), register 509 can store a first degree Taylor series coefficient (e.g., $F^1$(x0a), $F^1$(x1a), $F^1$(x2a), etc.), whereas register 508 can store a function value (e.g., F(x0a), F(x1a), F(x2a), etc.). Further, register 524 can store the difference Δ. Multiplexor 522 can be configured to send the unconverted output of second multiplier 516 to second adder 518. With these configurations, arithmetic circuits 446 can compute a second degree Taylor series expansion of function F at intermediate output 501 based on the following equation:

$$\text{Output}_{\text{First mode of operation}} = F(x0a) + \left(\frac{F^2(x0a)}{2} \times \Delta + F^1(x0a)\right) \times \Delta \quad \text{(Equation 11)}$$

In the second mode of operation, as shown in FIG. 5B, register 510 can store a first degree Taylor series coefficient (e.g., $F^1$(x0a), $F^1$(x1a), $F^1$(x2a), etc.), register 509 can store a function value (e.g., F(x0a), F(x1a), F(x2a), etc.), whereas register 508 can store quantized value offset $X_{qz}$. Further, register 524 can store the reciprocal value of $S_X$ (1/$S_X$). Multiplexor 522 can be configured to send the output of integer conversion module 520 to second adder 518. With these configurations, first multiplier 512 and first adder 514 can compute a first degree Taylor series expansion of function F at intermediate output 501 based on the following equation:

$$\text{Output}_{\text{Second mode of operation}} = F(x0a) + F^1(x0a) \times \Delta \quad \text{(Equation 12)}$$

In Equation 12, the activation function output $\text{Output}_{\text{First mode of operation}}$ is a FP32 number. The FP32 activation function output is then provided as an input to second multiplier 516. Second multiplier 516, integer conversion module 520, and second adder 518 can perform a quantization operation based on the following equation:

$$X_q = X_{qz} + \text{int}\left(\frac{1}{S_X} \times \text{Output}_{\text{Second mode of operation}}\right) \quad \text{(Equation 13)}$$

In Equation 13, $X_q$ is the quantized output, $X_{qz}$ is an offset to map a zero input to a zero quantized output, whereas $S_X$ is the floating point scaling factor, as described above with respect to Equation 4. To perform the quantization operation, multiplexor 534 can select the reciprocal of floating point scaling factor 1/$S_X$ as an input to second multiplier 516, with the FP32 activation function output provided as the other input to second multiplier 516, to scale the FP32 activation function output. Integer conversion module 520 can perform an integer conversion operation (e.g., flooring operation, rounding operation, etc.) on the scaled FP32 activation function output based on the techniques described above, and then convert the activation function output to UINT8 format. Multiplexor 522 can select the UINT8 activation function output as an input to second adder 518, whereas multiplexor 536 can select $X_{qz}$ as the other input to second adder 518. Second adder 518 can add $X_{qz}$ to the UINT8 activation function output to generate the quantized activation function output as described above in Equation 13. The quantized UINT8 activation function output can be forwarded to pooling engine 432, which can forward the quantized UINT8 activation function output (or after performing max pooling operation) to state buffer 422 for storage.

Although FIG. 5A and FIG. 5B illustrate that activation function table 444 stores first or second degree Taylor series coefficients, and that arithmetic circuits 446 can be configured to perform first degree or second degree Taylor series expansion approximation of the function, it is understood that the same techniques can be applied for approximation of higher degree of Taylor series expansion. For example, in some embodiments, activation function table 444 can be programmed to store second or third degree Taylor series coefficients, and arithmetic circuits 446 can be configured to perform second degree or third degree Taylor series expansion approximation of the function under different operation modes.

Figure 6:
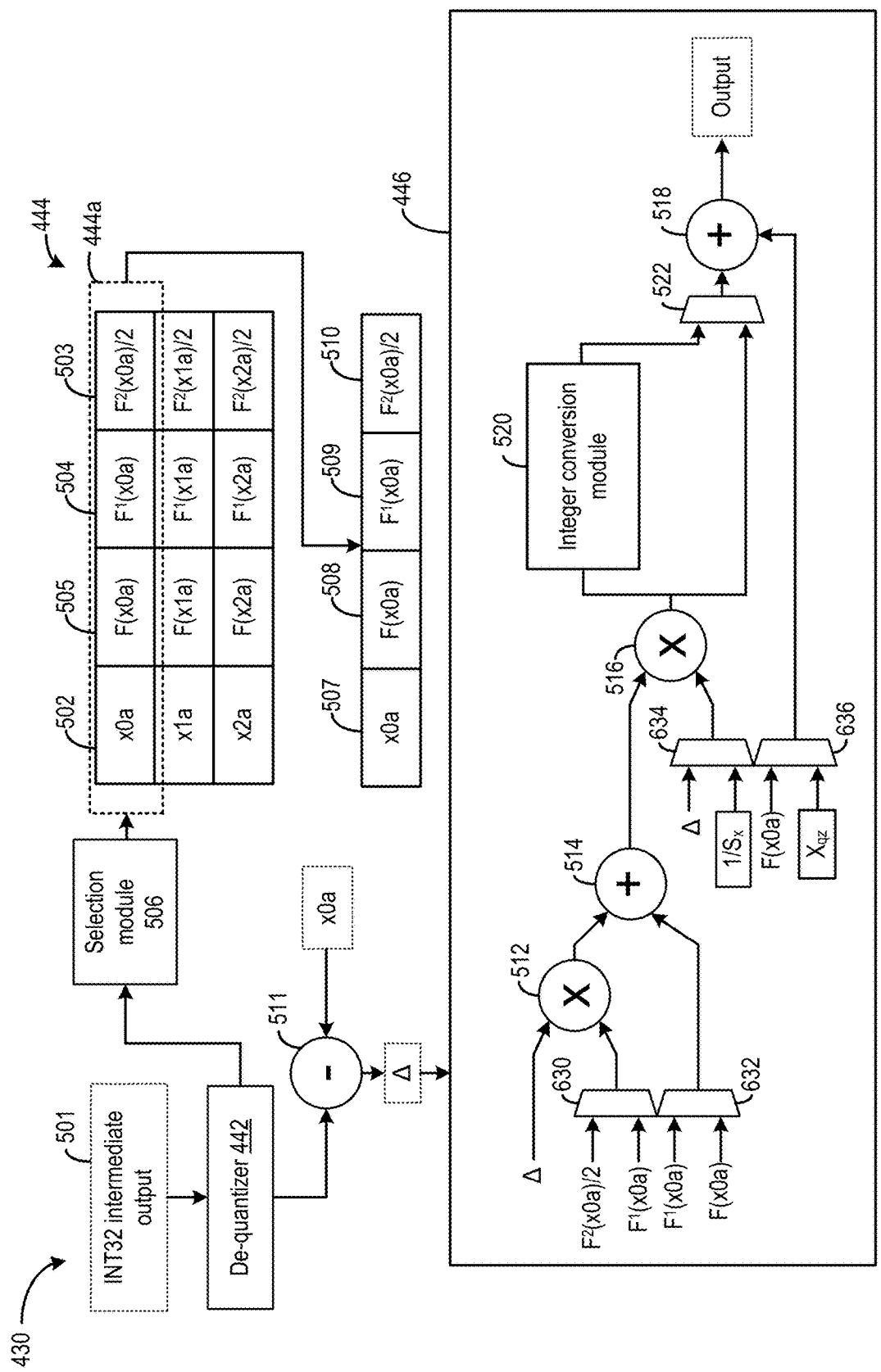
FIG. 6 illustrates an example of an activation function engine of the example neural network processor of FIG. 4A, according to certain aspects of the present disclosure.

In some examples, instead of switching the content stored in activation function table 444 between the two operation modes, different set of function parameters can be provided to arithmetic circuits 446 using multiplexors. FIG. 6 illustrates an example of internal components of activation function engine 430, including dequantizer 442, activation function table 444, and configurable arithmetic circuits 446. As shown in FIG. 6, each bucket of activation function table 444 stores boundary value 502 (e.g., "x0a"), first function parameter 503 (e.g., F(x0a)), second function parameter 504 (e.g., $F^1$(x0a)), third function parameter 505 (e.g., $F^2$(x0a)/2). Selection module 506 can select a bucket 444*a* based on INT32 intermediate output 501 and store the function parameters of bucket 444*a* in registers 507-510 as described above. In addition, subtractor 511 can determine a difference ("Δ") between the boundary value and the FP32 intermediate output is determined. The difference Δ is also provided to arithmetic circuits 446.

Arithmetic circuits 446 may further include multiplexors 630, 632, 634, and 636. The multiplexors can be controlled by computation controller 434 to select the inputs to first multiplier 512, first adder 514, second multiplier 516, and second adder 518 for the first mode of operation or the second mode of operation. For example, multiplexor 630 can select between register 510 and register 509 for an input to first multiplier 512. Multiplexor 632 can select between register 509 and register 508 for an input to first adder 514. Multiplexor 634 can select between difference ("A") and $1/S_X$ (both can be stored in registers) as input to second multiplier 516. Multiplexor 636 can select between register 508 and quantized value offset $X_q z$ as an input to second adder 518.

In the first mode of operation, multiplexor 630 can select third function parameter 505 ($F^2$(x0a)/2), which is stored in register 510, as an input to first multiplier 512. Multiplexor 532 can select second function parameter 504 ($F^1$(x0a)), which is stored in register 509, as an input to first adder 514. Multiplexor 534 can select difference Δ as an input to second multiplier 516. Multiplexor 536 can select first function parameter 503 (F(x0a)) as an input to second adder 518. Further, multiplexor 538 can select the original multiplication result from second multiplier 516, rather than the output of flooring and integer conversion module, to second adder 518. A second degree Taylor series expansion of the function F can be computed based on Equation 11 (reproduced below):

$$Output_{First\ mode\ of\ operation} = \qquad \text{(Equation 11)}$$
$$F(x0a) + \left(\frac{F^2(x0a)}{2} \times \Delta + F^1(x0a)\right) \times \Delta$$

In Equation 11, all the parameters and inputs can be FP32 numbers, and the activation function output $Output_{First\ mode\ of\ operation}$ is also a FP32 number. The FP32 activation function output can be written back to output buffer 428, which can forward the computation result to pooling engine 432 to perform the optional pooling operation and the quantization and integer conversion operations. Pooling engine 432 can then store the UINT8 quantized activation function outputs at state buffer 422.

In the second mode of operation, multiplexor 530 can select second function parameter 504 ($F^1$(x0a)) (stored in register 509) as an input to multiplier 512, whereas multiplexor 532 can select first function parameter 504 (F(x0a)) (stored in register 508) as an input to second adder 518, to compute a first degree Taylor series expansion of the function F based on the Equation 12 (reproduced below)

$$Output_{Second\ mode\ of\ operation}=F(x0a)+F^1(x0a)\times\Delta \qquad \text{(Equation 12)}$$

In Equation 12, the activation function output $Output_{First\ mode\ of\ operation}$ is a FP32 number. The FP32 activation function output is then provided as an input to second multiplier 516. Second multiplier 516, integer conversion module 520, and second adder 518 can perform a quantization operation based on Equation 13 (reproduced below)

$$X_q = X_{qz} + \text{int}\left(\frac{1}{S_X} \times Output_{Second\ mode\ of\ operation}\right) \qquad \text{(Equation 13)}$$

In Equation 13, $X_q$ is the quantized output, $X_{qz}$ is an offset to map a zero input to a zero quantized output, whereas $S_X$ is the floating point scaling factor, as described above with respect to Equation 4. To perform the quantization operation, multiplexor 534 can select the reciprocal of floating point scaling factor $1/S_X$ as an input to second multiplier 516, with the FP32 activation function output provided as the other input to second multiplier 516, to scale the FP32 activation function output. Flooring and integer conversion module 520 can perform a flooring operation on the scaled FP32 activation function output (e.g., by setting the mantissa to zero), and then convert the activation function output to UINT8 format. Multiplexor 522 can select the UINT8 activation function output as an input to second adder 518, whereas multiplexor 536 can select $X_{qz}$ as the other input to second adder 518. Second adder 518 can add $X_{qz}$ to the UINT8 activation function output to generate the quantized activation function output as described above in Equation 13. The quantized UINT8 activation function output can be forwarded to pooling engine 432, which can forward the quantized UINT8 activation function output (or after performing max pooling operation) to state buffer 422 for storage.

Figure 7:
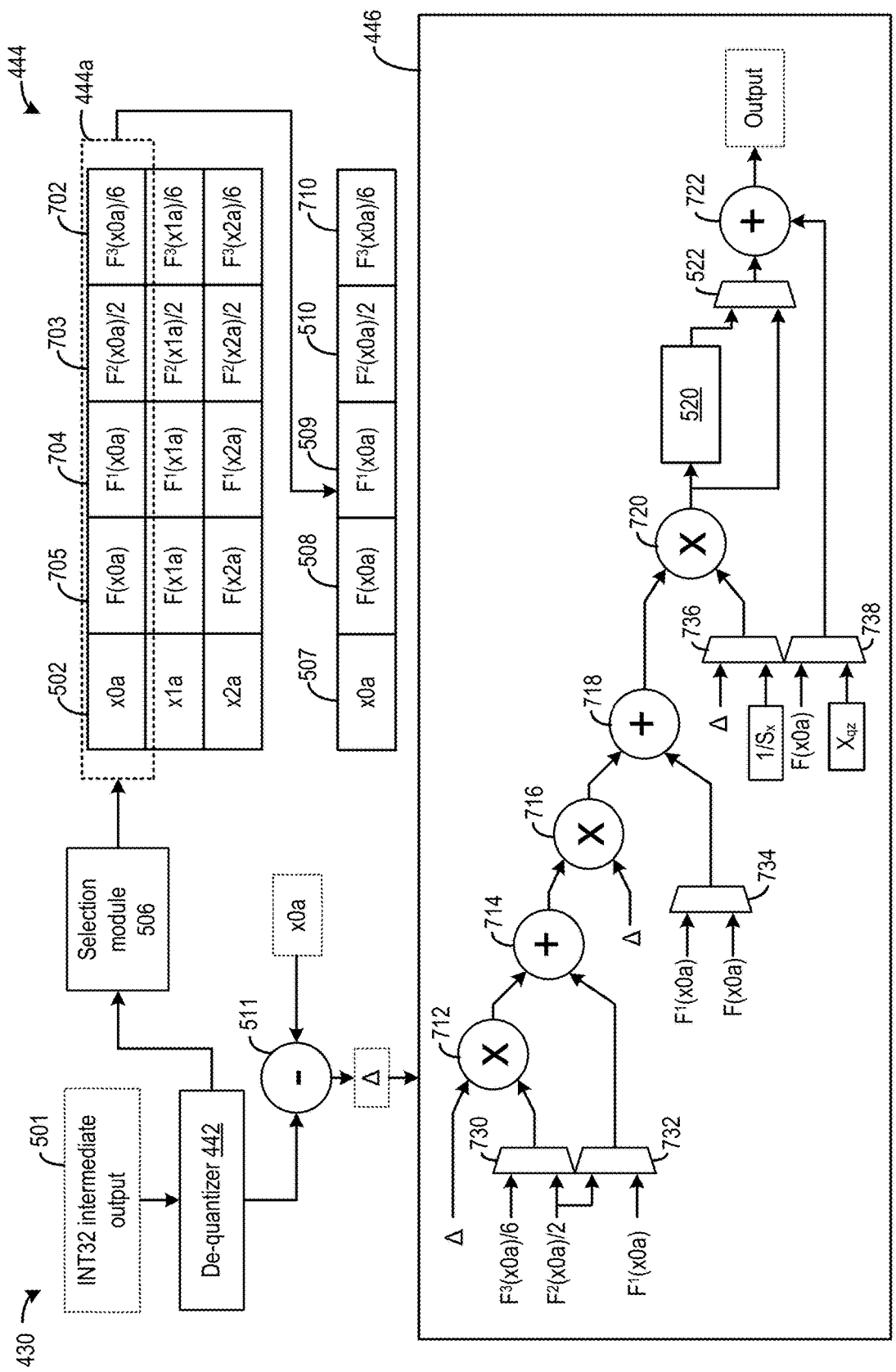
FIG. 7 illustrates another example of an activation function engine of the example neural network processor of FIG. 4A, according to certain aspects of the present disclosure.

FIG. 7 illustrates another example of internal components of activation function engine 430, including dequantizer 442, activation function table 444, and configurable arithmetic circuits 446. As shown in FIG. 7, activation function table 444 may store a plurality of buckets including bucket 444a. Each bucket stores boundary value 502 (e.g., "x0a"), first function parameter 503 (e.g., (F(x0a)), second function parameter 504 (e.g., $F^1$(x0a)), third function parameter 505 (e.g., $F^2$(x0a)/2), and a fourth function parameter 702, which can represent a fourth degree Taylor series coefficient of function F evaluated at the boundary value (e.g., $F^3$(x0a)/6). Selection module 506 can select a bucket 444a based on INT32 intermediate output 501 and store the function parameters of bucket 444a in registers 507-510 as described above. In addition, a register 710 can store the fourth function parameter 702 of the selected bucket. Compared with FIG. 6, activation function table 444 and arithmetic circuits 446 in FIG. 6 support computation of higher degree Taylor series expansion to improve the precision of the activation function approximation.

Arithmetic circuits 446 may include a first multiplier 712, a first adder 714, a second multiplier 716, a second adder 718, a third multiplier 720, a third adder 722, and integer conversion module 520 to perform quantization and integer conversion operations. Arithmetic circuits 446 may further include multiplexors 730, 732, 734, 736, 738, and 740. The multiplexors can be controlled by computation controller 434 to select the inputs to first multiplier 712, first adder 714, second multiplier 716, second adder 718, third multiplier 720, and third adder 722 for the first mode of operation or the second mode of operation. For example, multiplexor 730 can select between register 710 and register 510 for an input to first multiplier 712. Multiplexor 732 can select between register 510 and register 509 for an input to first adder 714. Multiplexor 734 can select between register 509 and register 508 for an input to second adder 718. Multiplexor 736 can select between difference ("Δ") and $1/S_X$ (both can be stored in registers) for an input to third multiplier 728. Multiplexor 738 can select between register 508 and quantized value offset $X_q z$ as an input to third adder 722.

Under the first mode of operation, multiplexor 730 can select fourth function parameter 702 ($F^3$(x0a)/6) (stored in register 710) as an input to first multiplier 712. Multiplexor 732 can select third function parameter 505 ($F^2$(x0a)/2) (stored in register 510) as an input to first adder 714. Multiplexor 734 can select second function parameter 504 ($F^1$(x0a)) (stored in register 509) as an input to second adder 718. Multiplexor 736 can select difference Δ as an input to third multiplier 720. Multiplexor 738 can select first function parameter 503 (F(x0a)) (stored in register 508) as an input to third adder 722. Multiplexor 522 can select the original multiplication result of third multiplier 720, rather than the output of integer conversion module 520, as an input to third adder 722. A third degree Taylor series expansion of the function F can be computed based on the following equation:

$$Output_{First\ mode\ of\ operation} = \qquad \text{(Equation 14)}$$
$$F(x0a) + \left(\left(\frac{F^3(x0a)}{6} \times \Delta + \frac{F^2(x0a)}{2}\right) \times \Delta + F^1(x0a)\right) \times \Delta$$

In Equation 14, all the parameters and inputs can be FP32 numbers, and the activation function output $Output_{First\ mode\ of\ operation}$ is also a FP32 number. The FP32 activation function output can be written back to output buffer 428, which can forward the computation result to pooling engine 432 to perform the optional pooling operation and the quantization and integer conversion operations. Pooling engine 432 can then store the UINT8 quantized activation function outputs at state buffer 422.

Under the second mode of operation, multiplexor 730 can select third function parameter 505 ($F^2$(x0a)/2) (stored in register 510) as an input to first multiplier 712, whereas multiplexor 732 can select second function parameter 504 ($F^1$(x0a)) (stored in register 509) as an input to first adder 714. Moreover, multiplexor 738 can select first function parameter 503 (F(x0a)) (stored in register 508) as an input to second adder 718. A second degree Taylor series expansion of the function F can be computed based on the following equation:

$$Output_{Second\ mode\ of\ operation} = \qquad \text{(Equation 15)}$$
$$F(x0a) + \left(\frac{F^2(x0a)}{2} \times \Delta + F^1(x0a)\right) \times \Delta$$

In Equation 15, the activation function output $Output_{First\ mode\ of\ operation}$ is a FP32 number. The FP32 activation function output is then provided as an input to third multiplier 620. Third multiplier 720 and third adder 722 can be configured to perform the quantization operation described in Equation 13 above. To perform the quantization operation, multiplexor 736 can select the reciprocal of floating point scaling factor $1/S_X$ as an input to third multiplier 720, with the FP32 activation function output provided as the other input to third multiplier 720, to scale the FP32 activation function output. Integer conversion module 520 can perform a flooring operation on the scaled FP32 activation function output (e.g., by setting the mantissa to zero), and then convert the activation function output to UINT8 format. Multiplexor 522 can select the UINT8 activation function output as an input to third adder 722, whereas multiplexor 638 can select $X_{qz}$ as the other input to third adder 722. Third adder 722 can add $X_{qz}$ to the UINT8 activation function output to generate the quantized activation function output as described above in Equation 13. The quantized UINT8 activation function output can be forwarded to pooling engine 432, which can forward the quantized UINT8 activation function output (or after performing a max pooling operation) to state buffer 422 for storage.

Figure 8:
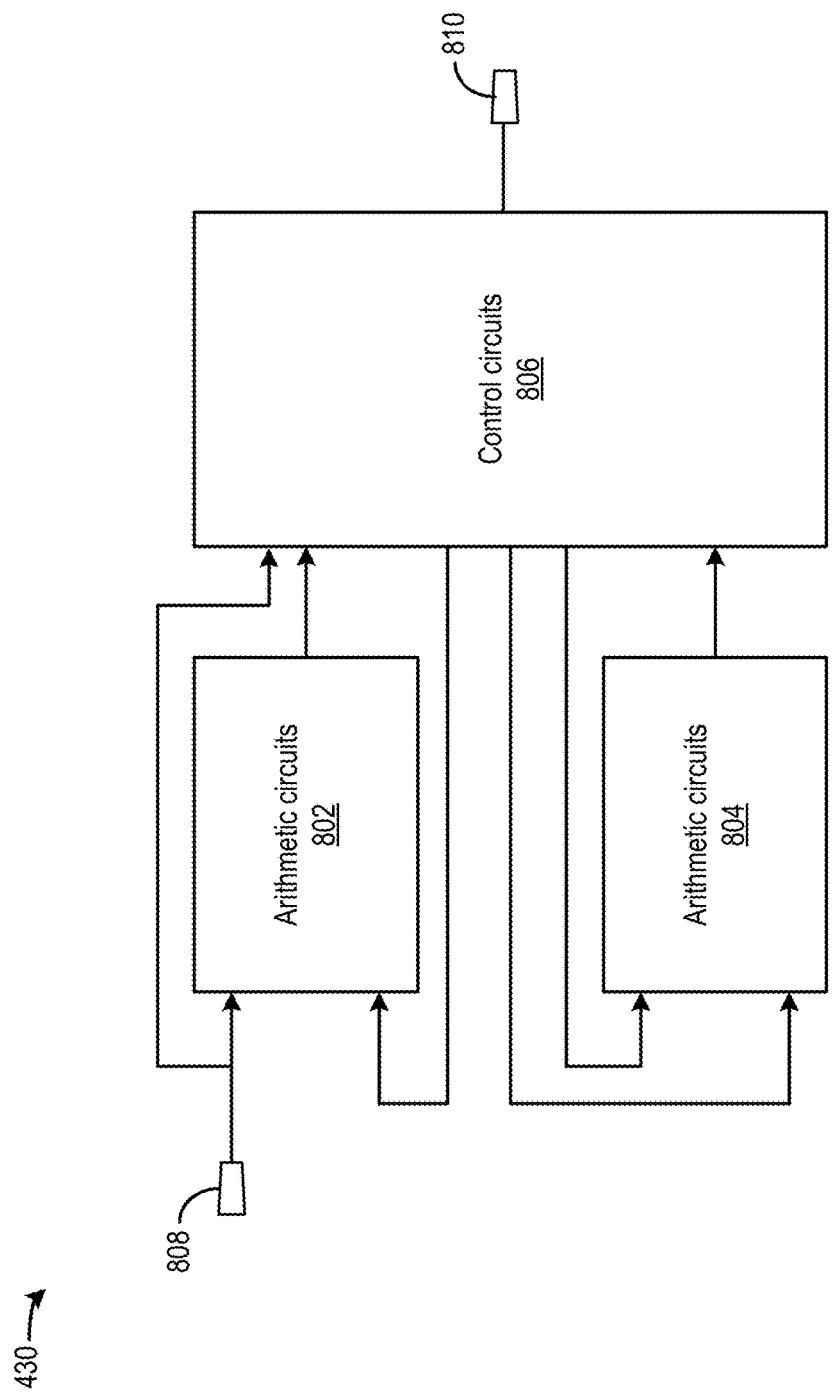
FIG. 8 illustrates an example of a pooling engine of the example neural network processor of FIG. 4A, according to certain aspects of the present disclosure.

FIG. 8 illustrates an example of internal components of pooling engine 432. As shown in FIG. 8, pooling engine 432 includes configurable arithmetic circuits 802 and 804, as well as configurable control circuits 806. Each of arithmetic circuits 802 and 804 may include an adder and a multiplier and can be configured to perform, for example, addition, multiplication, or a combination of both. Each of arithmetic circuits 802 and 804 and control circuits 806 are configurable to support different modes of operations of pooling engine 432 including, for example, a pooling operation, a quantization operation, and a forwarding operation. For a pooling operation, arithmetic circuits 802 can be configured to perform addition operations based on input 808, while arithmetic circuits 804 can be disabled. Control circuits 806 can be configured to, for example, accumulate and average a predetermined number of inputs 808 (e.g., for average pooling), store a maximum input 808 by using arithmetic circuits 802 to compare a current input 808 and the currently stored maximum input 808 (e.g., for max pooling), etc. The down-sampled output as a result of the pooling operation can be output as output 810. Moreover, for a quantization operation, arithmetic circuits 802 can be configured to perform multiplication, whereas arithmetic circuits 804 can be configured to perform addition. Control circuits can supply the reciprocal value of $S_X$ ($1/S_X$) to arithmetic circuits 802 to perform the scaling of input 808, and forward the scaled input 808 to arithmetic circuits 804 to add to the quantized value offset $X_q z$ to perform the quantization operation as described in Equation 13. Further, for forwarding operation, control circuits 806 can be configured to forward input 808 directly as output 810.

Figure 9:
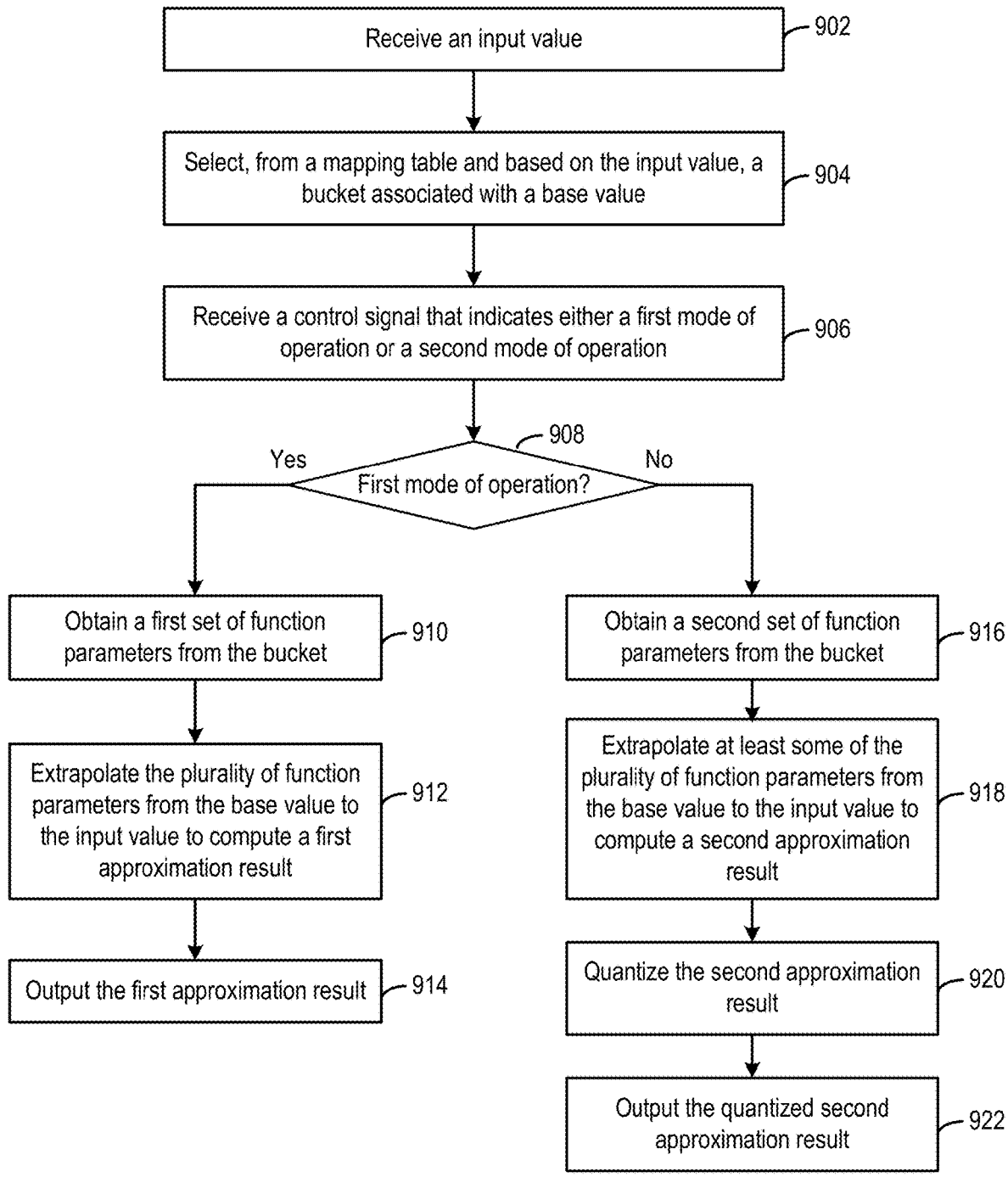
FIG. 9 illustrates a flowchart of an example method of neural network processing, according to certain aspects of the present disclosure.

FIG. 9 illustrate an example flow diagram of a process 900 for performing hardware-based mathematical function processing. Process 900 can be performed by, for example, various internal components of neural network processor 402 as described in FIG. 4A-FIG. 7B including, for example, activation function engine 430, and may include the techniques described above.

At operation 902, activation function engine 430 receives an input for activation function processing. The input may be intermediate output received from output buffer 428 and can be a 32-bit integer (INT32) number.

At operation 904, activation function engine 430 selects, from a mapping table and based on the input value, a bucket associated with a base value. The mapping table can include activation function table 444 and include a set of buckets, with each bucket storing a base value and a set of function parameters associated with the base value. The set of function parameters may include a function value obtained by evaluating the function at the base value. The set of function parameters may also include Taylor series expansion coefficients, or other function parameters for performing an extrapolation operation. The selection of the set of function parameters can be based on identifying a base value closest to the input value, and identifying the bucket that stores the base value.

In some examples, the set of function parameters stored in the bucket may be pre-programmed based on whether activation function engine 430 operates in a first mode of operation or in a second mode of operation. In a first mode of operation, a first set of function parameters may be stored in the bucket which supports a higher precision extrapolation (e.g., a second degree or a third degree Taylor series expansion) of the function. In a second mode of operation, a second set of function parameters may be stored in the bucket which supports a lower precision extrapolation operation, with the second set of function parameters being a subset of the first set of function parameters. In some examples, the same first set of function parameters is stored in the bucket between the first mode and second mode of operations, and a set of multiplexors can be used to select the first set of function parameters or the second set of function parameters (from the first set of function parameters) to perform the extrapolation operation.

At operation 906, activation function engine 430 receives a control signal that indicates either the first mode of operation or the second mode of operation. The control signal may be received from computation controller 434.

At operation 908, activation function engine 430 determines whether the control signal indicates the first mode or second mode of operations. If the control signal indicates the first mode of operation (at operation 908), arithmetic circuits 446 of activation function engine 430 can obtain the first set of function parameters from the bucket, at operation 910.

At operation 912, activation function engine 430 extrapolates the first set of function parameters from the base value to the input value to compute a first approximation result. The extrapolation can be performed by arithmetic circuits 446 based on, for example, Equations 11 and 14.

At operation 914, activation function engine 430 outputs the first approximation result. The first approximation result can be stored in output buffer 428, which can forward the first approximation result (as well as other approximation results) to pooling engine 432 to perform a pooling operation and quantization. Pooling engine 432 can store the quantized first approximation result in state buffer 422 for computations of the next neural network layer.

On the other hand, if the control signal indicates the second mode of operation (at operation 908), arithmetic circuits 446 of activation function engine 430 can obtain the second set of function parameters, at operation 916. There are various ways by which arithmetic circuits 446 obtain the second set of function parameters. For example, as described above, the second set of function parameters can be pre-programmed in activation function table 444 and stored in the bucket for the second mode of operation, and arithmetic circuits 446 can obtain the second set of function parameters directly from the bucket. As another example, arithmetic circuits 446 can include multiplexors to extract the second set of function parameters from the first set of function parameters stored in the bucket.

At operation 918, activation function engine 430 extrapolates the second set of function parameters from the base value to the input value to compute a second approximation result. The extrapolation can be performed by arithmetic circuits 446 based on, for example, Equations 12 and 15.

At operation 920, arithmetic circuits 446 performs quantization of the second approximation result. The quantization can be based on scaling of the second approximation result and adding a quantized value offset, as described in Equation 4. Arithmetic circuits 446 further includes a conversion module to convert the quantized second approximation result, which can be a floating point number, to an integer.

At operation 922, activation function engine 430 outputs the quantized second approximation result. The quantized second approximation result can be forwarded to pooling engine 432, which can perform pooling operation and store the quantized second approximation result in state buffer 422 for computations of the next neural network layer.

Figure 10:
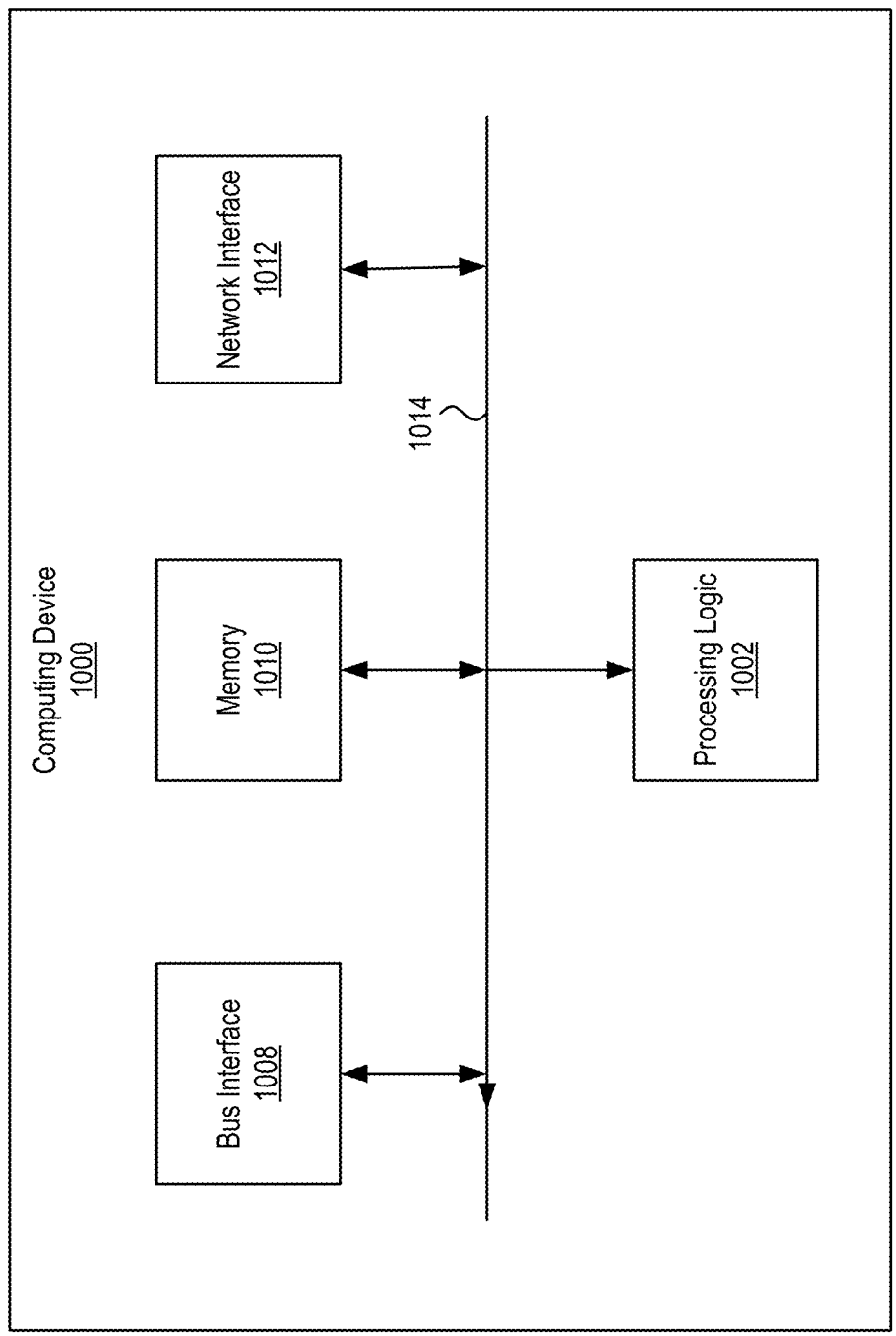
FIG. 10 illustrates an example of a computing device, according to certain aspects of the disclosure.

FIG. 10 illustrates an example of a computing device 1000. Functionality and/or several components of the computing device 1000 may be used without limitation with other embodiments disclosed elsewhere in this disclosure, without limitations. A computing device 1000 may perform computations to facilitate processing of a task. As an illustrative example, computing device 1000 can be part of a server in a multi-tenant compute service system. Various hardware and software resources of computing device 1000 (e.g., the hardware and software resources associated with provision of an image recognition service) can be allocated to a client upon request.

In one example, the computing device 1000 may include processing logic 1002, a bus interface module 1008, memory 1010, and a network interface module 1012. These modules may be hardware modules, software modules, or a combination of hardware and software. In certain instances, modules may be interchangeably used with components or engines, without deviating from the scope of the disclosure. The computing device 1000 may include additional modules, not illustrated here. In some implementations, the computing device 1000 may include fewer modules. In some implementations, one or more of the modules may be combined into one module. One or more of the modules may be in communication with each other over a communication channel 1014. The communication channel 1014 may include one or more busses, meshes, matrices, fabrics, a combination of these communication channels, or some other suitable communication channel.

The processing logic 1002 may include one or more integrated circuits, which may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 1002 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 1002 may be stored on a computer-readable storage medium, for example, in the form of a computer program. The computer-readable storage medium may be non-transitory. In some cases, the computer-readable medium may be part of the memory 1010. Processing logic 1002 may also include hardware circuities for performing artificial neural network computation including, for example, neural network processor(s) 402, etc.

The access to processing logic 1002 can be granted to a client to provide the personal assistant service requested by the client. For example, computing device 1000 may host a virtual machine, on which an image recognition software application can be executed. The image recognition software application, upon execution, may access processing logic 1002 to predict, for example, an object included in an image. As another example, access to processing logic 1002 can also be granted as part of bare-metal instance, in which an image recognition software application executing on a client device (e.g., a remote computer, a smart phone, etc.) can directly access processing logic 1002 to perform the recognition of an image.

The memory 1010 may include either volatile or non-volatile, or both volatile and non-volatile types of memory. The memory 1010 may, for example, include random access memory (RAM), read only memory (ROM), Electrically Erasable Programmable Read-Only Memory (EEPROM), flash memory, and/or some other suitable storage media. In some cases, some or all of the memory 1010 may be internal to the computing device 1000, while in other cases some or all of the memory may be external to the computing device 1000. The memory 1010 may store an operating system comprising executable instructions that, when executed by the processing logic 1002, provides the execution environment for executing instructions providing networking functionality for the computing device 1000. The memory 1010 may also store, for example, software applications for performing artificial neural network computation. For example, memory 1010 may store software routines related to the computations of the equations above. In a case where processing logic 1002 is in the form of FPGA, memory 1010 may store netlists data representing various logic circuit components of processing logic 1002. In some examples, memory 1010 can include memory 412.

The bus interface module 1008 may enable communication with external entities, such as a host device and/or other components in a computing system, over an external communication medium. The bus interface module 1008 may include a physical interface for connecting to a cable, socket, port, or other connection to the external communication medium. The bus interface module 1008 may further include hardware and/or software to manage incoming and outgoing transactions. The bus interface module 1008 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 1008 may include the physical layer for any of these bus protocols, including a connector, power management, and error handling, among other things. In some implementations, the computing device 1000 may include multiple bus interface modules for communicating with multiple external entities. These multiple bus interface modules may implement the same local bus protocol, different local bus protocols, or a combination of the same and different bus protocols.

The network interface module 1012 may include hardware and/or software for communicating with a network. This network interface module 1012 may, for example, include physical connectors or physical ports for wired connection to a network, and/or antennas for wireless communication to a network. The network interface module 1012 may further include hardware and/or software configured to implement a network protocol stack. The network interface module 1012 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 1000 may include multiple network interface modules, each configured to communicate with a different network. For example, in these implementations, the computing device 1000 may include a network interface module for communicating with a wired Ethernet network, a wireless 802.11 network, a cellular network, an Infiniband network, etc. In some embodiments, computing device 1000 may receive a set of parameters, such as the aforementioned weight vectors for generation of forget gate factor, input factor, output factor, etc. from a server through network interface module 1012.

The various components and modules of the computing device 1000, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed herein.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the figures and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An integrated circuit comprising:
   a hardware mapping table comprising a plurality of buckets, each bucket of the plurality of buckets configured to store a base value, wherein each bucket is further configured to, in a first mode of operation, store a first set of function parameters for a value of a function evaluated at the base value, and in a second mode of operation, store a second set of function parameters for the value of the function evaluated at the base value, the second set of function parameters being a subset of and not equal to the first set of function parameters;
   a selection module configured to:
      receive a request to evaluate the function at an input value; and
      select a bucket from the plurality of buckets based on a relationship between the input value and the base value stored in the bucket;
   an arithmetic circuit configured to:
      determine a difference between the input value and the base value;
      receive a control signal that indicates the first mode of operation or the second mode of operation;
      determine whether the control signal indicates the first mode of operation or the second mode of operation;
      if the control signal indicates the first mode of operation:
         obtain the first set of function parameters from the selected bucket; and
         determine a first estimated output value of the function at the input value based on the difference and the first set of function parameters;
      if the control signal indicates the second mode of operation:
         obtain the second set of function parameters from the selected bucket;
         determine a second estimated output value of the function at the input value based on the difference and the second set of function parameters; and
         quantize the second estimated output value to generate a quantized second estimated output value; and
      output the first estimated output value or the quantized second estimated output value.

2. The integrated circuit of claim 1, wherein:
   the first set of function parameters includes a first parameter, a second parameter, a third parameter, and fourth parameter;
   the second set of function parameters includes the second parameter, the third parameter, and the fourth parameter;
   the arithmetic circuits include a first arithmetic unit, a second arithmetic unit, and a third arithmetic unit each including a multiplier and an adder;
   in the first mode of operation:
      the first arithmetic unit is configured to process the first parameter, the second parameter, and the difference to generate a first intermediate output;

the second arithmetic unit is configured to process the first intermediate output, the third parameter, and the difference to generate a second intermediate output; and the third arithmetic unit is configured to process the second intermediate output, the fourth parameter, and the difference to generate the first estimated output value; and in the second mode of operation:

the first arithmetic unit is configured to process the second parameter, the third parameter, and the difference to generate a third intermediate output;

the second arithmetic unit is configured to process the third intermediate output, the fourth parameter, and the difference to generate the second estimated output value; and the third arithmetic unit is configured to quantize the second estimated output value to generate the quantized second estimated output value.

3. The integrated circuit of claim 1, wherein the first set of function parameters includes coefficients of a third-degree Taylor series expansion of the function, and wherein the second set of function parameters includes coefficients of a second-degree Taylor series expansion of the function.

4. The integrated circuit of claim 1, wherein the hardware mapping table is programmed by an application to store the first set of function parameters in the first mode of operation and to store the second set of function parameters in the second mode of operation.

5. A system comprising:

a controller;

configurable arithmetic circuits; and a mapping table that stores a first set of function parameters in a first mode of operation and stores a second set of function parameters in a second mode of operation, the second set of function parameters being a subset of and not equal to the first set of function parameters;

wherein the controller:

sends a control signal that indicates the first mode of operation or the second mode of operation;

if the control signal indicates the first mode of operation, configures the arithmetic circuits to:

compute a first approximation result of a function at an input value based on the first set of function parameters; and output the first approximation result;

if the control signal indicates the second mode of operation, configures the arithmetic circuits to:

compute a second approximation result of the function at the input value based on the second set of function parameters;

perform post-processing of the second approximation result to generate post-processed second approximation result; and output the post-processed second approximation result.

6. The system of claim 5, wherein the post-processing of the second approximation result comprises: scaling the second approximation result or quantizing the second approximation result.

7. The system of claim 6, wherein the first set of function parameters and the second set of function parameters are associated with a base value; and wherein the arithmetic circuits are configured to:

in the first mode of operation, extrapolate the first set of function parameters from the base value to the input value to compute the first approximation result; and in the second mode of operation, extrapolate the second set of function parameters from the base value to the input value to compute the second approximation result.

8. The system of claim 5, wherein:

the arithmetic circuits comprise a subtractor, a first adder, a first multiplier, a second adder, and a second multiplier; and the subtractor is configured to determine a difference between the base value and the input value.

9. The system of claim 8, wherein:

the first set of function parameters includes a first function parameter, a second function parameter, and a third function parameter;

in the first mode of operation:

the first multiplier is configured to multiply the difference with the first function parameter to generate a first multiple;

the first adder is configured to add the first multiple with the second function parameter to generate a first intermediate output;

the second multiplier is configured to multiply the difference with the first intermediate output to generate a second multiple; and the second adder is configured to add the second multiple with the third function parameter to generate the first approximation result.

10. The system of claim 9, wherein:

the second set of function parameters includes the second function parameter and the third function parameter;

in the second mode of operation:

the first multiplier is configured to multiply the difference with the second function parameter to generate a third multiple;

the first adder is configured to add the third multiple with the third function parameter to generate the second approximation result;

the second multiplier is configured to multiply the second approximation result with a scaling factor to generate a fourth multiple; and the second adder is configured to add the fourth multiple with an offset to generate the post-processed second approximation result.

11. The system of claim 10, wherein the scaling factor is a quantization scale factor, and wherein the offset is related to the quantization scale factor.

12. The system of claim 11, wherein the offset is configured such that the arithmetic circuits generate a zero post-processed second approximation result based on a zero input value.

13. The system of claim 9, wherein:

the first function parameter is based on evaluating a second derivative of the function at the base value;

the second function parameter is based on evaluating a first derivative of the function at the base value; and the third function parameter is based on evaluating the function at the base value.

14. The system of claim 5, wherein:

the arithmetic circuits comprise a subtractor, a first adder, a first multiplier, a second adder, a second multiplier, a third adder, and a third multiplier; and the subtractor is configured to determine a difference between the base value and the input value.

15. The system of claim 14, wherein:

the first set of function parameters includes a first function parameter, a second function parameter, a third function parameter, and a fourth function parameter;

the second set of function parameters includes the second function parameter, the third function parameter, and the fourth function parameter;
in the first mode of operation:
the first multiplier is configured to multiply the difference with the first function parameter to generate a first multiple;
the first adder is configured to add the first multiple with the second function parameter to generate a first intermediate output;
the second multiplier is configured to multiply the difference with the first intermediate output to generate a second multiple;
the second adder is configured to add the second multiple with the third function parameter to generate a second intermediate output;
the third multiplier is configured to multiply the difference with the second intermediate output to generate a third multiple; and
the third adder is configured to add the third multiple with the fourth function parameter to generate the first approximation result;
in the second mode of operation:
the first multiplier is configured to multiply the difference with the second function parameter to generate a fourth multiple;
the first adder is configured to add the fourth multiple with the third function parameter to generate a third intermediate output;
the second multiplier is configured to multiply the difference with the third intermediate output to generate a fifth multiple;
the second adder is configured to add the fifth multiple with the fourth function parameter to generate the second approximation result;
the third multiplier is configured to multiply the second approximation result with a scaling factor to generate a sixth multiple; and
the third adder is configured to add the sixth multiple with an offset to generate the post-processed second approximation result.

16. The system of claim 5, further comprising:
a computing engine configured to perform arithmetic operations for a neural network layer to generate partial weighted sums;
a summation buffer to generate a set of weighted sums by summing the partial weighted sums; and
wherein the arithmetic circuits are configured to,
in the first mode of operation:
generate a set of first approximation results of applying an activation function to the set of weighted sums; and
store the set of first approximation results at the summation buffer;
in the second mode of operation:
generate a set of quantized second approximation results of applying the activation function to the set of weighted sums to generate the second approximation result;
quantize the second approximation result to generate a set of quantized second approximation results; and
store the set of quantized second approximation results at the summation buffer.

17. The system of claim 16, further comprising:
a state buffer; and
a pooling engine configured to:
in the first mode of operation:
receive the set of first approximation results from the summation buffer;
perform a first pooling operation on the set of first approximation results to generate a first set of pooling results;
quantize the first set of pooling results to generate a set of quantized pooling results; and
store the first set of quantized pooling results at the state buffer as inputs for arithmetic operations of a next neural network layer; and
in the second mode of operation:
receive the set of quantized second approximation results from the summation buffer; and
store, at the state buffer the set of quantized second approximation results, or a second set of quantized pooling results based on performing a second pooling operation on the set of quantized second approximation results, as inputs for arithmetic operations of a next neural network layer.

18. A method comprising:
receiving an input value;
selecting, based on the input value, a bucket of a mapping table that stores a first set of function parameters under a first mode of operation and a second set of function parameters under a second mode of operation, both the first set of function parameters and the second set of function parameters being associated with a base value, the second set of function parameters being a subset of and not equal to the first set of function parameters;
receiving a control signal that indicates either the first mode of operation or the second mode of operation;
if the control signal indicates the first mode of operation, performing a first operation by:
obtaining the first set of function parameters from the bucket;
extrapolating the first set of function parameters from the base value to the input value to compute a first approximation result; and
outputting the first approximation result; and
if the control signal indicates the second mode of operation, performing a second operation by:
obtaining the second set of function parameters from the bucket;
extrapolating the second set of function parameters from the base value to the input value to compute a second approximation result;
quantizing the second approximation result to generate a quantized second approximation result; and
outputting the quantized second approximation result.

19. The method of claim 18, further comprising:
storing the first set of function parameters in the bucket in the first mode of operation; and
storing the second set of function parameters in the bucket in the second mode of operation.

* * * * *